(12) United States Patent
Bridges et al.

(10) Patent No.: US 9,551,575 B2
(45) Date of Patent: Jan. 24, 2017

(54) LASER SCANNER HAVING A MULTI-COLOR LIGHT SOURCE AND REAL-TIME COLOR RECEIVER

(71) Applicant: FARO Technologies, Inc., Lake Mary, FL (US)

(72) Inventors: Robert E. Bridges, Kennett Square, PA (US); Reinhard Becker, Ludwigsburg (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 172 days.

(21) Appl. No.: 14/525,316

(22) Filed: Oct. 28, 2014

(65) Prior Publication Data

US 2015/0043009 A1  Feb. 12, 2015

Related U.S. Application Data

(63) Continuation-in-part of application No. 13/259,446, filed as application No. PCT/EP2010/001779 on Mar. 22, 2010, now Pat. No. 9,074,883.

(Continued)

(30) Foreign Application Priority Data

Mar. 25, 2009 (DE) ........................ 10 2009 015 920

(51) Int. Cl.
*G01C 15/00* (2006.01)
*G01S 17/89* (2006.01)
(Continued)

(52) U.S. Cl.
CPC ........... *G01C 15/002* (2013.01); *G01S 7/4812* (2013.01); *G01S 7/4815* (2013.01); *G01S 7/4816* (2013.01);
(Continued)

(58) Field of Classification Search
CPC ............. G01C 3/08; G06F 15/00; G06F 15/05
(Continued)

(56) References Cited

U.S. PATENT DOCUMENTS 1,535,312 A   4/1925  Hosking
1,538,758 A   5/1925  Taylor
(Continued)

FOREIGN PATENT DOCUMENTS

AT         508635 A1     3/2011
AU      2005200937 A1    9/2006
(Continued)

OTHER PUBLICATIONS

YK Cho, et al., "Light-weight 3D Ladar System for Construction Robotic Operations" (pp. 237-244); 26th International Symposium on Automation and Robotics in Construction (ISARC 2009), Jun. 24, 2009.

(Continued)

*Primary Examiner* — Luke Ratcliffe
(74) *Attorney, Agent, or Firm* — Cantor Colburn LLP

(57) ABSTRACT

A laser scanner includes a light emitter that generates a modulated light beam for measuring distance and red, blue, and green lights for capturing colors. The beam is collimated and directed to an object point with a steering mirror. Reflected light from the object point is directed by the steering mirror onto scanner optics. The reflected light is directed to an optical receiver that sends the first light in a first path and the second, third and fourth lights in a second path to a color receiver. The first light is demodulated to determine distance to the target. The second, third, and fourth lights are separated and measured to determine three color values. The color values are combined with the measured distance value to determine a color 3D coordinate for the object point.

12 Claims, 6 Drawing Sheets

Related U.S. Application Data

(60) Provisional application No. 61/299,566, filed on Jan. 29, 2010.

(51) Int. Cl.

| | | |
|---|---|---|
| *G01S 17/02* | (2006.01) | |
| *G01S 17/36* | (2006.01) | |
| *G01S 17/42* | (2006.01) | |
| *G01S 7/481* | (2006.01) | |

(52) U.S. Cl.
CPC ............ *G01S 7/4817* (2013.01); *G01S 17/023* (2013.01); *G01S 17/36* (2013.01); *G01S 17/42* (2013.01); *G01S 17/89* (2013.01)

(58) Field of Classification Search
USPC ...................................................... 356/4.01
See application file for complete search history.

(56) References Cited

U.S. PATENT DOCUMENTS

| | | |
|---|---|---|
| 1,918,813 A | 7/1933 | Kinzy |
| 2,316,573 A | 4/1943 | Egy |
| 2,333,243 A | 11/1943 | Glab |
| 2,702,683 A | 2/1955 | Green et al. |
| 2,748,926 A | 6/1956 | Leahy |
| 2,983,367 A | 6/1958 | Paramater et al. |
| 2,924,495 A | 9/1958 | Haines |
| 2,966,257 A | 12/1960 | Littlejohn |
| 3,066,790 A | 12/1962 | Armbruster |
| 3,447,852 A | 6/1969 | Barlow |
| 3,458,167 A | 7/1969 | Cooley, Jr. |
| 3,830,567 A | 8/1974 | Riegl |
| 3,899,145 A | 8/1975 | Stephenson |
| 3,945,729 A | 3/1976 | Rosen |
| 4,138,045 A | 2/1979 | Baker |
| 4,178,515 A | 12/1979 | Tarasevich |
| 4,340,008 A | 7/1982 | Mendelson |
| 4,379,461 A | 4/1983 | Nilsson et al. |
| 4,424,899 A | 1/1984 | Rosenberg |
| 4,430,796 A | 2/1984 | Nakagawa |
| 4,457,625 A | 7/1984 | Greenleaf et al. |
| 4,506,448 A | 3/1985 | Topping et al. |
| 4,537,233 A | 8/1985 | Vroonland et al. |
| 4,561,776 A | 12/1985 | Pryor |
| 4,606,696 A | 8/1986 | Slocum |
| 4,659,280 A | 4/1987 | Akeel |
| 4,663,852 A | 5/1987 | Guarini |
| 4,664,588 A | 5/1987 | Newell et al. |
| 4,667,231 A | 5/1987 | Pryor |
| 4,676,002 A | 6/1987 | Slocum |
| 4,714,339 A | 12/1987 | Lau et al. |
| 4,733,961 A | 3/1988 | Mooney |
| 4,736,218 A | 4/1988 | Kutman |
| 4,751,950 A | 6/1988 | Bock |
| 4,767,257 A | 8/1988 | Kato |
| 4,790,651 A | 12/1988 | Brown et al. |
| 4,816,822 A | 3/1989 | Vache et al. |
| 4,870,274 A | 9/1989 | Hebert et al. |
| 4,882,806 A | 11/1989 | Davis |
| 4,954,952 A | 9/1990 | Ubhayakar et al. |
| 4,982,841 A | 1/1991 | Goedecke |
| 4,984,881 A | 1/1991 | Osada et al. |
| 4,996,909 A | 3/1991 | Vache et al. |
| 4,999,491 A | 3/1991 | Semler et al. |
| 5,021,641 A | 6/1991 | Swartz et al. |
| 5,025,966 A | 6/1991 | Potter |
| 5,027,951 A | 7/1991 | Johnson |
| 5,068,971 A | 12/1991 | Simon |
| 5,069,524 A | 12/1991 | Watanabe et al. |
| 5,155,684 A | 10/1992 | Burke et al. |
| 5,168,532 A | 12/1992 | Seppi et al. |
| 5,177,556 A | 1/1993 | Rioux |
| 5,189,797 A | 3/1993 | Granger |
| 5,205,111 A | 4/1993 | Johnson |
| 5,211,476 A | 5/1993 | Coudroy |
| 5,213,240 A | 5/1993 | Dietz et al. |
| 5,216,479 A | 6/1993 | Dotan et al. |
| 5,218,427 A | 6/1993 | Koch |
| 5,219,423 A | 6/1993 | Kamaya |
| 5,239,855 A | 8/1993 | Schleifer et al. |
| 5,289,264 A | 2/1994 | Steinbichler |
| 5,289,265 A | 2/1994 | Inoue et al. |
| 5,289,855 A | 3/1994 | Baker et al. |
| 5,313,261 A | 5/1994 | Leatham et al. |
| 5,319,445 A | 6/1994 | Fitts |
| 5,329,347 A | 7/1994 | Wallace et al. |
| 5,329,467 A | 7/1994 | Nagamune et al. |
| 5,332,315 A | 7/1994 | Baker et al. |
| 5,371,347 A | 12/1994 | Plesko |
| 5,372,250 A | 12/1994 | Johnson |
| 5,373,346 A | 12/1994 | Hocker |
| 5,402,365 A | 3/1995 | Kozikaro et al. |
| 5,402,582 A | 4/1995 | Raab |
| 5,412,880 A | 5/1995 | Raab |
| 5,416,505 A | 5/1995 | Eguchi et al. |
| 5,430,384 A | 7/1995 | Hocker |
| 5,446,846 A | 8/1995 | Lennartsson |
| 5,455,670 A | 10/1995 | Payne et al. |
| 5,455,993 A | 10/1995 | Link et al. |
| 5,510,977 A | 4/1996 | Raab |
| 5,517,297 A | 5/1996 | Stenton |
| 5,528,354 A | 6/1996 | Uwira |
| 5,528,505 A | 6/1996 | Granger et al. |
| 5,535,524 A | 7/1996 | Carrier et al. |
| 5,611,147 A | 3/1997 | Raab |
| 5,615,489 A | 4/1997 | Breyer et al. |
| 5,623,416 A | 4/1997 | Hocker, III |
| 5,629,756 A | 5/1997 | Kitajima |
| 5,668,631 A | 9/1997 | Norita et al. |
| 5,675,326 A | 10/1997 | Juds et al. |
| 5,677,760 A | 10/1997 | Mikami et al. |
| 5,682,508 A | 10/1997 | Hocker, III |
| 5,716,036 A | 2/1998 | Isobe et al. |
| 5,724,264 A | 3/1998 | Rosenberg et al. |
| 5,734,417 A | 3/1998 | Yamamoto et al. |
| 5,745,225 A | 4/1998 | Watanabe et al. |
| 5,752,112 A | 5/1998 | Paddock et al. |
| 5,754,449 A | 5/1998 | Hoshal et al. |
| 5,768,792 A | 6/1998 | Raab |
| 5,793,993 A | 8/1998 | Broedner et al. |
| 5,804,805 A | 9/1998 | Koenck et al. |
| 5,825,666 A | 10/1998 | Freifeld |
| 5,829,148 A | 11/1998 | Eaton |
| 5,831,719 A | 11/1998 | Berg et al. |
| 5,832,416 A | 11/1998 | Anderson |
| 5,844,591 A | 12/1998 | Takamatsu et al. |
| 5,856,874 A | 1/1999 | Tachibana et al. |
| 5,887,122 A | 3/1999 | Terawaki et al. |
| 5,894,123 A | 4/1999 | Ohtomo et al. |
| 5,898,490 A | 4/1999 | Ohtomo et al. |
| 5,909,939 A | 6/1999 | Fugmann |
| 5,926,782 A | 7/1999 | Raab |
| 5,933,267 A | 8/1999 | Ishizuka |
| 5,936,721 A | 8/1999 | Ohtomo et al. |
| 5,940,170 A | 8/1999 | Berg et al. |
| 5,940,181 A | 8/1999 | Tsubono et al. |
| 5,949,530 A | 9/1999 | Wetteborn |
| 5,956,857 A | 9/1999 | Raab |
| 5,969,321 A | 10/1999 | Danielson et al. |
| 5,973,788 A | 10/1999 | Pettersen et al. |
| 5,978,748 A | 11/1999 | Raab |
| 5,983,936 A | 11/1999 | Schwieterman et al. |
| 5,988,862 A | 11/1999 | Kacyra et al. |
| 5,991,011 A | 11/1999 | Damm |
| 5,996,790 A | 12/1999 | Yamada et al. |
| 5,997,779 A | 12/1999 | Potter |
| 6,040,898 A | 3/2000 | Mrosik et al. |
| D423,534 S | 4/2000 | Raab et al. |
| 6,050,615 A | 4/2000 | Weinhold |
| 6,057,915 A | 5/2000 | Squire et al. |
| 6,060,889 A | 5/2000 | Hocker |
| 6,067,116 A | 5/2000 | Yamano et al. |
| 6,069,700 A | 5/2000 | Rudnick et al. |

(56) References Cited

U.S. PATENT DOCUMENTS

| | | | |
|---|---|---|---|
| 6,077,306 A | 6/2000 | Metzger et al. |
| 6,112,423 A | 9/2000 | Sheehan |
| 6,115,511 A | 9/2000 | Sakai et al. |
| 6,125,337 A | 9/2000 | Rosenberg et al. |
| 6,131,299 A | 10/2000 | Raab et al. |
| 6,134,507 A | 10/2000 | Markey, Jr. et al. |
| 6,138,915 A | 10/2000 | Danielson et al. |
| 6,149,112 A | 11/2000 | Thieltges |
| 6,151,789 A | 11/2000 | Raab et al. |
| 6,163,294 A | 12/2000 | Talbot |
| 6,166,504 A | 12/2000 | Iida et al. |
| 6,166,809 A | 12/2000 | Pettersen et al. |
| 6,166,811 A | 12/2000 | Long et al. |
| 6,204,961 B1 | 3/2001 | Anderson et al. |
| 6,219,928 B1 | 4/2001 | Raab et al. |
| D441,632 S | 5/2001 | Raab et al. |
| 6,240,651 B1 | 6/2001 | Schroeder et al. |
| 6,253,458 B1 | 7/2001 | Raab et al. |
| 6,282,195 B1 | 8/2001 | Miller et al. |
| 6,285,390 B1 | 9/2001 | Blake |
| 6,298,569 B1 | 10/2001 | Raab et al. |
| 6,339,410 B1 | 1/2002 | Milner et al. |
| 6,349,249 B1 | 2/2002 | Cunningham |
| 6,366,831 B1 | 4/2002 | Raab |
| 6,408,252 B1 | 6/2002 | De Smet |
| 6,418,774 B1 | 7/2002 | Brogaardh et al. |
| 6,438,507 B1 | 8/2002 | Imai |
| 6,438,856 B1 | 8/2002 | Kaczynski |
| 6,442,419 B1 | 8/2002 | Chu et al. |
| 6,445,446 B1 | 9/2002 | Kumagai et al. |
| 6,460,004 B2 | 10/2002 | Greer et al. |
| 6,470,584 B1 | 10/2002 | Stoodley |
| 6,477,784 B2 | 11/2002 | Schroeder et al. |
| 6,480,270 B1 | 11/2002 | Studnicka et al. |
| 6,483,106 B1 | 11/2002 | Ohtomo et al. |
| 6,497,394 B1 | 12/2002 | Dunchock |
| 6,504,602 B1 | 1/2003 | Hinderling |
| 6,512,575 B1 | 1/2003 | Marchi |
| 6,519,860 B1 | 2/2003 | Bieg et al. |
| D472,824 S | 4/2003 | Raab et al. |
| 6,547,397 B1 | 4/2003 | Kaufman et al. |
| 6,598,306 B2 | 7/2003 | Eaton |
| 6,611,346 B2 | 8/2003 | Granger |
| 6,611,617 B1 | 8/2003 | Crampton |
| D479,544 S | 9/2003 | Raab et al. |
| 6,612,044 B2 | 9/2003 | Raab et al. |
| 6,621,065 B1 | 9/2003 | Fukumoto et al. |
| 6,626,339 B2 | 9/2003 | Gates et al. |
| 6,633,051 B1 | 10/2003 | Holloway et al. |
| 6,649,208 B2 | 11/2003 | Rodgers |
| 6,650,402 B2 | 11/2003 | Sullivan et al. |
| 6,668,466 B1 | 12/2003 | Bieg et al. |
| 6,675,122 B1 | 1/2004 | Markendorf et al. |
| 6,681,495 B2 | 1/2004 | Masayuki et al. |
| 6,710,859 B2 | 3/2004 | Shirai et al. |
| D490,831 S | 6/2004 | Raab et al. |
| D491,210 S | 6/2004 | Raab et al. |
| 6,750,873 B1 | 6/2004 | Bernardini et al. |
| 6,753,876 B2 | 6/2004 | Brooksby et al. |
| 6,759,649 B2 | 7/2004 | Hipp |
| 6,759,979 B2 | 7/2004 | Vashisth et al. |
| 6,764,185 B1 | 7/2004 | Beardsley et al. |
| 6,789,327 B2 | 9/2004 | Roth et al. |
| 6,820,346 B2 | 11/2004 | Raab et al. |
| 6,822,749 B1 | 11/2004 | Christoph |
| 6,825,923 B2 | 11/2004 | Hamar et al. |
| 6,826,664 B2 | 11/2004 | Hocker, III et al. |
| 6,847,436 B2 | 1/2005 | Bridges |
| 6,856,381 B2 | 2/2005 | Christoph |
| 6,858,836 B1 | 2/2005 | Hartrumpf |
| 6,859,269 B2 | 2/2005 | Ohtomo et al. |
| 6,862,097 B2 | 3/2005 | Yanagisawa et al. |
| 6,868,359 B2 | 3/2005 | Raab |
| 6,879,933 B2 | 4/2005 | Steffey et al. |
| 6,889,903 B1 | 5/2005 | Koenck |
| 6,892,465 B2 | 5/2005 | Raab et al. |
| 6,894,767 B2 | 5/2005 | Ishinabe et al. |
| 6,895,347 B2 | 5/2005 | Dorny et al. |
| 6,901,673 B1 | 6/2005 | Cobb et al. |
| 6,904,691 B2 | 6/2005 | Raab et al. |
| 6,914,678 B1 | 7/2005 | Ulrichsen et al. |
| 6,917,415 B2 | 7/2005 | Gogolla et al. |
| 6,920,697 B2 | 7/2005 | Raab et al. |
| 6,925,722 B2 | 8/2005 | Raab et al. |
| 6,931,745 B2 | 8/2005 | Granger |
| 6,935,036 B2 | 8/2005 | Raab et al. |
| 6,935,748 B2 | 8/2005 | Kaufman et al. |
| 6,948,255 B2 | 9/2005 | Russell |
| 6,957,496 B2 | 10/2005 | Raab et al. |
| 6,965,843 B2 | 11/2005 | Raab et al. |
| 6,973,734 B2 | 12/2005 | Raab et al. |
| 6,988,322 B2 | 1/2006 | Raab et al. |
| 6,989,890 B2 | 1/2006 | Riegl et al. |
| 7,003,892 B2 | 2/2006 | Eaton et al. |
| 7,006,084 B1 | 2/2006 | Buss et al. |
| 7,024,032 B2 | 4/2006 | Kidd et al. |
| 7,029,126 B2 | 4/2006 | Tang |
| 7,032,321 B2 | 4/2006 | Raab et al. |
| 7,040,136 B2 | 5/2006 | Forss et al. |
| 7,051,447 B2 | 5/2006 | Kikuchi et al. |
| 7,069,124 B1 | 6/2006 | Whittaker et al. |
| 7,069,875 B2 | 7/2006 | Warecki |
| 7,076,420 B1 | 7/2006 | Snyder et al. |
| 7,106,421 B2 | 9/2006 | Matsuura et al. |
| 7,117,107 B2 | 10/2006 | Dorny et al. |
| 7,120,092 B2 | 10/2006 | Del Prado Pavon et al. |
| 7,127,822 B2 | 10/2006 | Kumagai et al. |
| 7,136,153 B2 | 11/2006 | Mori et al. |
| 7,140,213 B2 | 11/2006 | Feucht et al. |
| 7,142,289 B2 | 11/2006 | Ando et al. |
| 7,145,926 B2 | 12/2006 | Vitruk et al. |
| 7,152,456 B2 | 12/2006 | Eaton |
| 7,174,651 B2 | 2/2007 | Raab et al. |
| 7,180,072 B2 | 2/2007 | Persi et al. |
| 7,184,047 B1 | 2/2007 | Crampton |
| 7,190,465 B2 | 3/2007 | Froehlich et al. |
| 7,191,541 B1 | 3/2007 | Weekers et al. |
| 7,193,690 B2 | 3/2007 | Ossig et al. |
| 7,196,509 B2 | 3/2007 | Teng |
| 7,199,872 B2 | 4/2007 | Van Cranenbroeck |
| 7,200,246 B2 | 4/2007 | Cofer et al. |
| 7,202,941 B2 | 4/2007 | Munro |
| 7,230,689 B2 | 6/2007 | Lau |
| 7,242,590 B1 | 7/2007 | Yeap et al. |
| 7,246,030 B2 | 7/2007 | Raab et al. |
| 7,249,421 B2 | 7/2007 | MacManus et al. |
| 7,256,899 B1 | 8/2007 | Faul et al. |
| 7,269,910 B2 | 9/2007 | Raab et al. |
| D551,943 S | 10/2007 | Hodjat et al. |
| 7,285,793 B2 | 10/2007 | Husted |
| 7,296,364 B2 | 11/2007 | Seitz et al. |
| 7,296,955 B2 | 11/2007 | Dreier |
| 7,296,979 B2 | 11/2007 | Raab et al. |
| 7,306,339 B2 | 12/2007 | Kaufman et al. |
| 7,307,701 B2 | 12/2007 | Hoffman, II |
| 7,312,862 B2 | 12/2007 | Zumbrunn et al. |
| 7,313,264 B2 | 12/2007 | Crampton |
| D559,657 S | 1/2008 | Wohlford et al. |
| 7,319,512 B2 | 1/2008 | Ohtomo et al. |
| 7,330,242 B2 | 2/2008 | Reichert et al. |
| 7,337,344 B2 | 2/2008 | Barman et al. |
| 7,342,650 B2 | 3/2008 | Kern et al. |
| 7,348,822 B2 | 3/2008 | Baer |
| 7,352,446 B2 | 4/2008 | Bridges et al. |
| 7,360,648 B1 | 4/2008 | Blaschke |
| 7,372,558 B2 | 5/2008 | Kaufman et al. |
| 7,372,581 B2 | 5/2008 | Raab et al. |
| 7,383,638 B2 | 6/2008 | Granger |
| 7,388,654 B2 | 6/2008 | Raab et al. |
| 7,389,870 B2 | 6/2008 | Slappay |
| 7,395,606 B2 | 7/2008 | Crampton |
| 7,400,384 B1 | 7/2008 | Evans et al. |
| 7,403,269 B2 | 7/2008 | Yamashita et al. |
| 7,430,068 B2 | 9/2008 | Becker et al. |

(56) References Cited

U.S. PATENT DOCUMENTS

| | | |
|---|---|---|
| 7,430,070 B2 | 9/2008 | Soreide et al. |
| 7,441,341 B2 | 10/2008 | Eaton |
| 7,443,555 B2 | 10/2008 | Blug et al. |
| 7,447,931 B1 | 11/2008 | Rischar et al. |
| 7,449,876 B2 | 11/2008 | Pleasant et al. |
| 7,454,265 B2 | 11/2008 | Marsh |
| 7,463,368 B2 | 12/2008 | Morden et al. |
| 7,477,359 B2 | 1/2009 | England et al. |
| 7,480,037 B2 | 1/2009 | Palmateer et al. |
| 7,508,496 B2 | 3/2009 | Mettenleiter et al. |
| 7,508,971 B2 | 3/2009 | Vaccaro et al. |
| 7,515,256 B2 | 4/2009 | Ohtomo et al. |
| 7,525,276 B2 | 4/2009 | Eaton |
| 7,527,205 B2 | 5/2009 | Zhu et al. |
| 7,528,768 B2 | 5/2009 | Wakayama et al. |
| 7,541,830 B2 | 6/2009 | Fahrbach et al. |
| 7,545,517 B2 | 6/2009 | Rueb et al. |
| 7,546,689 B2 | 6/2009 | Ferrari et al. |
| 7,551,771 B2 | 6/2009 | England, III |
| 7,552,644 B2 | 6/2009 | Haase et al. |
| 7,557,824 B2 | 7/2009 | Holliman |
| 7,561,598 B2 | 7/2009 | Stratton et al. |
| 7,564,250 B2 | 7/2009 | Hocker |
| 7,568,293 B2 | 8/2009 | Ferrari |
| 7,578,069 B2 | 8/2009 | Eaton |
| D599,226 S | 9/2009 | Gerent et al. |
| 7,589,595 B2 | 9/2009 | Cutler |
| 7,589,825 B2 | 9/2009 | Orchard et al. |
| 7,591,077 B2 | 9/2009 | Pettersson |
| 7,591,078 B2 | 9/2009 | Crampton |
| 7,599,106 B2 | 10/2009 | Matsumoto et al. |
| 7,600,061 B2 | 10/2009 | Honda |
| 7,602,873 B2 | 10/2009 | Eidson |
| 7,604,207 B2 | 10/2009 | Hasloecher et al. |
| 7,610,175 B2 | 10/2009 | Eidson |
| 7,614,157 B2 | 11/2009 | Granger |
| 7,624,510 B2 | 12/2009 | Ferrari |
| 7,625,335 B2 | 12/2009 | Deichmann et al. |
| 7,626,690 B2 | 12/2009 | Kumagai et al. |
| D607,350 S | 1/2010 | Cooduvalli et al. |
| 7,656,751 B2 | 2/2010 | Rischar et al. |
| 7,659,995 B2 | 2/2010 | Knighton et al. |
| D610,926 S | 3/2010 | Gerent et al. |
| 7,693,325 B2 | 4/2010 | Pulla et al. |
| 7,697,748 B2 | 4/2010 | Dimsdale et al. |
| 7,701,592 B2 | 4/2010 | Saint Clair et al. |
| 7,712,224 B2 | 5/2010 | Hicks |
| 7,721,396 B2 | 5/2010 | Fleischman |
| 7,728,833 B2 | 6/2010 | Verma et al. |
| 7,728,963 B2 | 6/2010 | Kirschner |
| 7,733,544 B2 | 6/2010 | Becker et al. |
| 7,735,234 B2 | 6/2010 | Briggs et al. |
| 7,743,524 B2 | 6/2010 | Eaton et al. |
| 7,752,003 B2 | 7/2010 | MacManus |
| 7,756,615 B2 | 7/2010 | Barfoot et al. |
| 7,765,707 B2 | 8/2010 | Tomelleri |
| 7,769,559 B2 | 8/2010 | Reichert |
| 7,774,949 B2 | 8/2010 | Ferrari |
| 7,779,548 B2 | 8/2010 | Ferrari |
| 7,779,553 B2 | 8/2010 | Jordil et al. |
| 7,784,194 B2 | 8/2010 | Raab et al. |
| 7,787,670 B2 | 8/2010 | Urushiya |
| 7,793,425 B2 | 9/2010 | Bailey |
| 7,798,453 B2 | 9/2010 | Maningo et al. |
| 7,800,758 B1 | 9/2010 | Bridges et al. |
| 7,804,602 B2 | 9/2010 | Raab |
| 7,805,851 B2 | 10/2010 | Pettersson |
| 7,805,854 B2 | 10/2010 | Eaton |
| 7,809,518 B2 | 10/2010 | Zhu et al. |
| 7,834,985 B2 | 11/2010 | Morcom |
| 7,847,922 B2 | 12/2010 | Gittinger et al. |
| RE42,055 E | 1/2011 | Raab |
| 7,869,005 B2 | 1/2011 | Ossig et al. |
| RE42,082 E | 2/2011 | Raab et al. |
| 7,881,896 B2 | 2/2011 | Atwell et al. |
| 7,889,324 B2 | 2/2011 | Yamamoto |
| 7,891,248 B2 | 2/2011 | Hough et al. |
| 7,900,714 B2 | 3/2011 | Milbourne et al. |
| 7,903,245 B2 | 3/2011 | Miousset et al. |
| 7,903,261 B2 | 3/2011 | Saint Clair et al. |
| 7,908,757 B2 | 3/2011 | Ferrari |
| 7,933,055 B2 | 4/2011 | Jensen et al. |
| 7,935,928 B2 | 5/2011 | Seger et al. |
| 7,965,747 B2 | 6/2011 | Kumano |
| 7,982,866 B2 | 7/2011 | Vogel |
| D643,319 S | 8/2011 | Ferrari et al. |
| 7,990,397 B2 | 8/2011 | Bukowski et al. |
| 7,994,465 B1 | 8/2011 | Bamji et al. |
| 7,995,834 B1 | 8/2011 | Knighton et al. |
| 8,001,697 B2 | 8/2011 | Danielson et al. |
| 8,013,983 B2 | 9/2011 | Lin et al. |
| 8,020,657 B2 | 9/2011 | Allard et al. |
| 8,022,812 B2 | 9/2011 | Beniyama et al. |
| 8,028,432 B2 | 10/2011 | Bailey et al. |
| 8,045,762 B2 | 10/2011 | Otani et al. |
| 8,051,710 B2 | 11/2011 | Van Dam et al. |
| 8,052,857 B2 | 11/2011 | Townsend |
| 8,064,046 B2 | 11/2011 | Ossig et al. |
| 8,065,861 B2 | 11/2011 | Caputo |
| 8,082,673 B2 | 12/2011 | Desforges et al. |
| 8,099,877 B2 | 1/2012 | Champ |
| 8,117,668 B2 | 2/2012 | Crampton et al. |
| 8,123,350 B2 | 2/2012 | Cannell et al. |
| 8,152,071 B2 | 4/2012 | Doherty et al. |
| D659,035 S | 5/2012 | Ferrari et al. |
| 8,171,650 B2 | 5/2012 | York et al. |
| 8,179,936 B2 | 5/2012 | Bueche et al. |
| D662,427 S | 6/2012 | Bailey et al. |
| 8,218,131 B2 | 7/2012 | Otani et al. |
| 8,224,032 B2 | 7/2012 | Fuchs et al. |
| 8,260,483 B2 | 9/2012 | Barfoot et al. |
| 8,269,984 B2 | 9/2012 | Hinderling et al. |
| 8,276,286 B2 | 10/2012 | Bailey et al. |
| 8,284,407 B2 | 10/2012 | Briggs et al. |
| 8,310,653 B2 | 11/2012 | Ogawa et al. |
| 8,321,612 B2 | 11/2012 | Hartwich et al. |
| 8,346,392 B2 | 1/2013 | Walser et al. |
| 8,346,480 B2 | 1/2013 | Trepagnier et al. |
| 8,352,212 B2 | 1/2013 | Fetter et al. |
| 8,353,059 B2 | 1/2013 | Crampton et al. |
| D676,341 S | 2/2013 | Bailey et al. |
| 8,379,191 B2 | 2/2013 | Braunecker et al. |
| 8,381,704 B2 | 2/2013 | Debelak et al. |
| 8,384,914 B2 | 2/2013 | Becker et al. |
| D678,085 S | 3/2013 | Bailey et al. |
| 8,391,565 B2 | 3/2013 | Purcell et al. |
| 8,402,669 B2 | 3/2013 | Ferrari et al. |
| 8,422,035 B2 | 4/2013 | Hinderling et al. |
| 8,497,901 B2 | 7/2013 | Pettersson |
| 8,533,967 B2 | 9/2013 | Bailey et al. |
| 8,537,374 B2 | 9/2013 | Briggs et al. |
| 8,619,265 B2 | 12/2013 | Steffey et al. |
| 8,645,022 B2 | 2/2014 | Yoshimura et al. |
| 8,659,748 B2 | 2/2014 | Dakin et al. |
| 8,659,752 B2 | 2/2014 | Cramer et al. |
| 8,661,700 B2 | 3/2014 | Briggs et al. |
| 8,677,643 B2 | 3/2014 | Bridges et al. |
| 8,683,709 B2 | 4/2014 | York |
| 8,699,007 B2 | 4/2014 | Becker et al. |
| 8,705,012 B2 | 4/2014 | Greiner et al. |
| 8,705,016 B2 | 4/2014 | Schumann et al. |
| 8,718,837 B2 | 5/2014 | Wang et al. |
| 8,784,425 B2 | 7/2014 | Ritchey et al. |
| 8,797,552 B2 | 8/2014 | Suzuki et al. |
| 8,830,485 B2 | 9/2014 | Woloschyn |
| 2001/0004269 A1 | 6/2001 | Shibata et al. |
| 2002/0032541 A1 | 3/2002 | Raab et al. |
| 2002/0059042 A1 | 5/2002 | Kacyra et al. |
| 2002/0087233 A1 | 7/2002 | Raab |
| 2002/0100884 A1 | 8/2002 | Maddock |
| 2002/0128790 A1 | 9/2002 | Woodmansee |
| 2002/0143506 A1 | 10/2002 | D'Aligny et al. |
| 2002/0149694 A1 | 10/2002 | Seo |
| 2002/0170192 A1 | 11/2002 | Steffey et al. |

(56) References Cited

U.S. PATENT DOCUMENTS

| | | |
|---|---|---|
| 2002/0176097 A1 | 11/2002 | Rodgers |
| 2003/0002055 A1 | 1/2003 | Kilthau et al. |
| 2003/0033104 A1 | 2/2003 | Gooche |
| 2003/0043386 A1 | 3/2003 | Froehlich et al. |
| 2003/0053037 A1 | 3/2003 | Blaesing-Bangert et al. |
| 2003/0066954 A1 | 4/2003 | Hipp |
| 2003/0090646 A1 | 5/2003 | Riegl et al. |
| 2003/0125901 A1 | 7/2003 | Steffey et al. |
| 2003/0137449 A1 | 7/2003 | Vashisth et al. |
| 2003/0142631 A1 | 7/2003 | Silvester |
| 2003/0167647 A1 | 9/2003 | Raab et al. |
| 2003/0172536 A1 | 9/2003 | Raab et al. |
| 2003/0172537 A1 | 9/2003 | Raab et al. |
| 2003/0179361 A1 | 9/2003 | Ohtomo et al. |
| 2003/0208919 A1 | 11/2003 | Raab et al. |
| 2003/0221326 A1 | 12/2003 | Raab et al. |
| 2004/0004727 A1 | 1/2004 | Yanagisawa et al. |
| 2004/0022416 A1 | 2/2004 | Lemelson et al. |
| 2004/0027554 A1 | 2/2004 | Ishinabe et al. |
| 2004/0040166 A1 | 3/2004 | Raab et al. |
| 2004/0103547 A1 | 6/2004 | Raab et al. |
| 2004/0111908 A1 | 6/2004 | Raab et al. |
| 2004/0135990 A1 | 7/2004 | Ohtomo et al. |
| 2004/0139265 A1 | 7/2004 | Hocker, III et al. |
| 2004/0158355 A1 | 8/2004 | Holmqvist et al. |
| 2004/0162700 A1 | 8/2004 | Rosenberg et al. |
| 2004/0179570 A1 | 9/2004 | Vitruk et al. |
| 2004/0221790 A1 | 11/2004 | Sinclair et al. |
| 2004/0246462 A1 | 12/2004 | Kaneko et al. |
| 2004/0259533 A1 | 12/2004 | Nixon et al. |
| 2005/0016008 A1 | 1/2005 | Raab et al. |
| 2005/0024625 A1 | 2/2005 | Mori et al. |
| 2005/0028393 A1 | 2/2005 | Raab et al. |
| 2005/0046823 A1 | 3/2005 | Ando et al. |
| 2005/0058332 A1 | 3/2005 | Kaufman et al. |
| 2005/0082262 A1 | 4/2005 | Rueb et al. |
| 2005/0085940 A1 | 4/2005 | Griggs et al. |
| 2005/0111514 A1 | 5/2005 | Matsumoto et al. |
| 2005/0141052 A1 | 6/2005 | Becker et al. |
| 2005/0144799 A1 | 7/2005 | Raab et al. |
| 2005/0150123 A1 | 7/2005 | Eaton |
| 2005/0151963 A1 | 7/2005 | Pulla et al. |
| 2005/0166413 A1 | 8/2005 | Crampton |
| 2005/0172503 A1 | 8/2005 | Kumagai et al. |
| 2005/0188557 A1 | 9/2005 | Raab et al. |
| 2005/0190384 A1 | 9/2005 | Persi et al. |
| 2005/0259271 A1 | 11/2005 | Christoph |
| 2005/0276466 A1 | 12/2005 | Vaccaro et al. |
| 2005/0283989 A1 | 12/2005 | Pettersson |
| 2006/0016086 A1 | 1/2006 | Raab et al. |
| 2006/0017720 A1 | 1/2006 | Li |
| 2006/0026851 A1 | 2/2006 | Raab et al. |
| 2006/0028203 A1 | 2/2006 | Kawashima et al. |
| 2006/0053647 A1 | 3/2006 | Raab et al. |
| 2006/0056559 A1 | 3/2006 | Pleasant et al. |
| 2006/0059270 A1 | 3/2006 | Pleasant et al. |
| 2006/0061566 A1 | 3/2006 | Verma et al. |
| 2006/0088044 A1 | 4/2006 | Hammerl et al. |
| 2006/0096108 A1 | 5/2006 | Raab et al. |
| 2006/0103853 A1 | 5/2006 | Palmateer |
| 2006/0109536 A1 | 5/2006 | Mettenleiter et al. |
| 2006/0123649 A1 | 6/2006 | Muller |
| 2006/0129349 A1 | 6/2006 | Raab et al. |
| 2006/0132803 A1 | 6/2006 | Clair et al. |
| 2006/0145703 A1 | 7/2006 | Steinbichler et al. |
| 2006/0169050 A1 | 8/2006 | Kobayashi et al. |
| 2006/0169608 A1 | 8/2006 | Carnevali et al. |
| 2006/0170870 A1 | 8/2006 | Kaufman et al. |
| 2006/0186301 A1 | 8/2006 | Dozier et al. |
| 2006/0193521 A1 | 8/2006 | England, III et al. |
| 2006/0241791 A1 | 10/2006 | Pokorny et al. |
| 2006/0279246 A1 | 12/2006 | Hashimoto et al. |
| 2006/0282574 A1 | 12/2006 | Zotov et al. |
| 2006/0287769 A1 | 12/2006 | Yanagita et al. |
| 2006/0291970 A1 | 12/2006 | Granger |
| 2007/0019212 A1 | 1/2007 | Gatsios et al. |
| 2007/0030841 A1 | 2/2007 | Lee et al. |
| 2007/0043526 A1 | 2/2007 | De Jonge et al. |
| 2007/0050774 A1 | 3/2007 | Eldson et al. |
| 2007/0055806 A1 | 3/2007 | Stratton et al. |
| 2007/0058154 A1 | 3/2007 | Reichert et al. |
| 2007/0058162 A1 | 3/2007 | Granger |
| 2007/0064976 A1 | 3/2007 | England, III |
| 2007/0097382 A1 | 5/2007 | Granger |
| 2007/0100498 A1 | 5/2007 | Matsumoto et al. |
| 2007/0105238 A1 | 5/2007 | Mandl et al. |
| 2007/0118269 A1 | 5/2007 | Gibson et al. |
| 2007/0122250 A1 | 5/2007 | Mullner |
| 2007/0142970 A1 | 6/2007 | Burbank et al. |
| 2007/0147265 A1 | 6/2007 | Eidson et al. |
| 2007/0147435 A1 | 6/2007 | Hamilton et al. |
| 2007/0147562 A1 | 6/2007 | Eidson |
| 2007/0150111 A1 | 6/2007 | Wu et al. |
| 2007/0151390 A1 | 7/2007 | Blumenkranz et al. |
| 2007/0153297 A1 | 7/2007 | Lau |
| 2007/0163134 A1 | 7/2007 | Eaton |
| 2007/0163136 A1 | 7/2007 | Eaton et al. |
| 2007/0171394 A1 | 7/2007 | Steiner et al. |
| 2007/0176648 A1 | 8/2007 | Baer |
| 2007/0177016 A1 | 8/2007 | Wu |
| 2007/0181685 A1 | 8/2007 | Zhu et al. |
| 2007/0183459 A1 | 8/2007 | Eidson |
| 2007/0185682 A1 | 8/2007 | Eidson |
| 2007/0217169 A1 | 9/2007 | Yeap et al. |
| 2007/0217170 A1 | 9/2007 | Yeap et al. |
| 2007/0221522 A1 | 9/2007 | Yamada et al. |
| 2007/0223477 A1 | 9/2007 | Eidson |
| 2007/0229929 A1 | 10/2007 | Soreide et al. |
| 2007/0247615 A1 | 10/2007 | Bridges |
| 2007/0248122 A1 | 10/2007 | Hamilton |
| 2007/0256311 A1 | 11/2007 | Ferrari |
| 2007/0257660 A1 | 11/2007 | Pleasant et al. |
| 2007/0258378 A1 | 11/2007 | Hamilton |
| 2007/0282564 A1 | 12/2007 | Sprague et al. |
| 2007/0294045 A1 | 12/2007 | Atwell et al. |
| 2008/0046221 A1 | 2/2008 | Stathis |
| 2008/0052808 A1 | 3/2008 | Leick et al. |
| 2008/0052936 A1 | 3/2008 | Briggs et al. |
| 2008/0066583 A1 | 3/2008 | Lott et al. |
| 2008/0068103 A1 | 3/2008 | Cutler |
| 2008/0075325 A1 | 3/2008 | Otani et al. |
| 2008/0075326 A1 | 3/2008 | Otani et al. |
| 2008/0080562 A1 | 4/2008 | Burch et al. |
| 2008/0096108 A1 | 4/2008 | Sumiyama et al. |
| 2008/0098272 A1 | 4/2008 | Fairbanks et al. |
| 2008/0148585 A1 | 6/2008 | Raab et al. |
| 2008/0154538 A1 | 6/2008 | Stathis |
| 2008/0179206 A1 | 7/2008 | Feinstein et al. |
| 2008/0183065 A1 | 7/2008 | Goldbach |
| 2008/0196260 A1 | 8/2008 | Pettersson |
| 2008/0204699 A1 | 8/2008 | Benz et al. |
| 2008/0216552 A1 | 9/2008 | Ibach et al. |
| 2008/0228331 A1 | 9/2008 | McNerney et al. |
| 2008/0232269 A1 | 9/2008 | Tatman et al. |
| 2008/0235969 A1 | 10/2008 | Jordil et al. |
| 2008/0235970 A1 | 10/2008 | Crampton |
| 2008/0240321 A1 | 10/2008 | Narus et al. |
| 2008/0245452 A1 | 10/2008 | Law et al. |
| 2008/0246943 A1 | 10/2008 | Kaufman et al. |
| 2008/0252671 A1 | 10/2008 | Cannell et al. |
| 2008/0256814 A1 | 10/2008 | Pettersson |
| 2008/0257023 A1 | 10/2008 | Jordil et al. |
| 2008/0263411 A1 | 10/2008 | Baney et al. |
| 2008/0271332 A1 | 11/2008 | Jordil et al. |
| 2008/0273758 A1 | 11/2008 | Fuchs et al. |
| 2008/0282564 A1 | 11/2008 | Pettersson |
| 2008/0295349 A1 | 12/2008 | Uhl et al. |
| 2008/0298254 A1 | 12/2008 | Eidson |
| 2008/0302200 A1 | 12/2008 | Tobey |
| 2008/0309460 A1 | 12/2008 | Jefferson et al. |
| 2008/0309546 A1 | 12/2008 | Wakayama et al. |
| 2009/0000136 A1 | 1/2009 | Crampton |
| 2009/0010740 A1 | 1/2009 | Ferrari et al. |
| 2009/0013548 A1 | 1/2009 | Ferrari |

(56) References Cited

U.S. PATENT DOCUMENTS

| | | |
|---|---|---|
| 2009/0016475 A1 | 1/2009 | Rischar et al. |
| 2009/0021351 A1 | 1/2009 | Beniyama et al. |
| 2009/0031575 A1 | 2/2009 | Tomelleri |
| 2009/0046140 A1 | 2/2009 | Lashmet et al. |
| 2009/0046752 A1 | 2/2009 | Bueche et al. |
| 2009/0046895 A1 | 2/2009 | Pettersson et al. |
| 2009/0049704 A1 | 2/2009 | Styles et al. |
| 2009/0051938 A1 | 2/2009 | Miousset et al. |
| 2009/0083985 A1 | 4/2009 | Ferrari |
| 2009/0089004 A1 | 4/2009 | Vook et al. |
| 2009/0089078 A1 | 4/2009 | Bursey |
| 2009/0089233 A1 | 4/2009 | Gach et al. |
| 2009/0089623 A1 | 4/2009 | Neering et al. |
| 2009/0095047 A1 | 4/2009 | Patel et al. |
| 2009/0100949 A1 | 4/2009 | Shirai et al. |
| 2009/0109797 A1 | 4/2009 | Eidson |
| 2009/0113183 A1 | 4/2009 | Barford et al. |
| 2009/0113229 A1 | 4/2009 | Cataldo et al. |
| 2009/0122805 A1 | 5/2009 | Epps et al. |
| 2009/0125196 A1 | 5/2009 | Velazquez et al. |
| 2009/0133276 A1 | 5/2009 | Bailey |
| 2009/0133494 A1 | 5/2009 | Van Dam et al. |
| 2009/0139105 A1 | 6/2009 | Granger |
| 2009/0157419 A1 | 6/2009 | Bursey |
| 2009/0161091 A1 | 6/2009 | Yamamoto |
| 2009/0165317 A1 | 7/2009 | Little |
| 2009/0177435 A1 | 7/2009 | Heininen |
| 2009/0177438 A1 | 7/2009 | Raab |
| 2009/0185741 A1 | 7/2009 | Nahari et al. |
| 2009/0187373 A1 | 7/2009 | Atwell |
| 2009/0241360 A1 | 10/2009 | Tait et al. |
| 2009/0249634 A1 | 10/2009 | Pettersson |
| 2009/0265946 A1 | 10/2009 | Jordil et al. |
| 2009/0273771 A1 | 11/2009 | Gittinger |
| 2009/0299689 A1 | 12/2009 | Stubben |
| 2009/0323742 A1 | 12/2009 | Kumano |
| 2010/0030421 A1 | 2/2010 | Yoshimura et al. |
| 2010/0040742 A1 | 2/2010 | Dijkhuis et al. |
| 2010/0049891 A1 | 2/2010 | Hartwich et al. |
| 2010/0053591 A1* | 3/2010 | Gibson ............... H04N 9/3129 356/3.09 |
| 2010/0057392 A1 | 3/2010 | York |
| 2010/0078866 A1 | 4/2010 | Pettersson |
| 2010/0095542 A1 | 4/2010 | Ferrari |
| 2010/0122920 A1 | 5/2010 | Butter et al. |
| 2010/0123892 A1 | 5/2010 | Miller et al. |
| 2010/0134596 A1 | 6/2010 | Becker |
| 2010/0135534 A1 | 6/2010 | Weston et al. |
| 2010/0148013 A1 | 6/2010 | Bhotika et al. |
| 2010/0195086 A1 | 8/2010 | Ossig et al. |
| 2010/0207938 A1 | 8/2010 | Yau et al. |
| 2010/0208062 A1 | 8/2010 | Pettersson |
| 2010/0208318 A1 | 8/2010 | Jensen et al. |
| 2010/0245851 A1 | 9/2010 | Teodorescu |
| 2010/0277472 A1 | 11/2010 | Kaltenbach et al. |
| 2010/0277747 A1 | 11/2010 | Rueb et al. |
| 2010/0281705 A1 | 11/2010 | Verdi et al. |
| 2010/0286941 A1 | 11/2010 | Merlot |
| 2010/0302528 A1* | 12/2010 | Hall .................. G01C 1/04 356/5.01 |
| 2010/0312524 A1 | 12/2010 | Siercks et al. |
| 2010/0318319 A1 | 12/2010 | Maierhofer |
| 2010/0325907 A1 | 12/2010 | Tait |
| 2011/0000095 A1 | 1/2011 | Carlson |
| 2011/0007305 A1 | 1/2011 | Bridges et al. |
| 2011/0007326 A1 | 1/2011 | Daxauer et al. |
| 2011/0013199 A1 | 1/2011 | Siercks et al. |
| 2011/0019155 A1 | 1/2011 | Daniel et al. |
| 2011/0023578 A1 | 2/2011 | Grasser |
| 2011/0025905 A1 | 2/2011 | Tanaka |
| 2011/0043515 A1 | 2/2011 | Stathis |
| 2011/0066781 A1 | 3/2011 | Debelak et al. |
| 2011/0094908 A1 | 4/2011 | Trieu et al. |
| 2011/0107611 A1 | 5/2011 | Desforges et al. |
| 2011/0107612 A1 | 5/2011 | Ferrari et al. |
| 2011/0107614 A1 | 5/2011 | Champ |
| 2011/0111849 A1 | 5/2011 | Sprague et al. |
| 2011/0112786 A1 | 5/2011 | Desforges et al. |
| 2011/0119025 A1 | 5/2011 | Fetter et al. |
| 2011/0123097 A1 | 5/2011 | Van Coppenolle |
| 2011/0164114 A1 | 7/2011 | Kobayashi et al. |
| 2011/0166824 A1 | 7/2011 | Haisty et al. |
| 2011/0169924 A1 | 7/2011 | Haisty et al. |
| 2011/0173823 A1 | 7/2011 | Bailey et al. |
| 2011/0173827 A1 | 7/2011 | Bailey et al. |
| 2011/0173828 A1 | 7/2011 | York |
| 2011/0178755 A1 | 7/2011 | York |
| 2011/0178758 A1 | 7/2011 | Atwell et al. |
| 2011/0178762 A1 | 7/2011 | York |
| 2011/0178764 A1 | 7/2011 | York |
| 2011/0178765 A1 | 7/2011 | Atwell et al. |
| 2011/0192043 A1 | 8/2011 | Ferrari et al. |
| 2011/0273568 A1 | 11/2011 | Lagassey et al. |
| 2011/0282622 A1 | 11/2011 | Canter et al. |
| 2011/0288684 A1 | 11/2011 | Farlow et al. |
| 2012/0019806 A1 | 1/2012 | Becker et al. |
| 2012/0035788 A1 | 2/2012 | Trepagnier et al. |
| 2012/0044476 A1 | 2/2012 | Earhart et al. |
| 2012/0046820 A1 | 2/2012 | Allard et al. |
| 2012/0069325 A1 | 3/2012 | Schumann et al. |
| 2012/0069352 A1 | 3/2012 | Ossig et al. |
| 2012/0070077 A1 | 3/2012 | Ossig et al. |
| 2012/0113913 A1 | 5/2012 | Tiirola et al. |
| 2012/0140244 A1 | 6/2012 | Gittinger et al. |
| 2012/0154786 A1 | 6/2012 | Gosch et al. |
| 2012/0155744 A1 | 6/2012 | Kennedy et al. |
| 2012/0169876 A1 | 7/2012 | Reichert et al. |
| 2012/0181194 A1 | 7/2012 | McEwan et al. |
| 2012/0197439 A1 | 8/2012 | Wang et al. |
| 2012/0210678 A1 | 8/2012 | Alcouloumre et al. |
| 2012/0217357 A1 | 8/2012 | Franke |
| 2012/0229788 A1 | 9/2012 | Schumann et al. |
| 2012/0260512 A1 | 10/2012 | Kretschmer et al. |
| 2012/0260611 A1 | 10/2012 | Jones |
| 2012/0262700 A1 | 10/2012 | Schumann et al. |
| 2012/0287265 A1 | 11/2012 | Schumann et al. |
| 2013/0010307 A1 | 1/2013 | Greiner et al. |
| 2013/0025143 A1 | 1/2013 | Bailey et al. |
| 2013/0025144 A1 | 1/2013 | Briggs et al. |
| 2013/0027515 A1 | 1/2013 | Vinther et al. |
| 2013/0062243 A1 | 3/2013 | Chang et al. |
| 2013/0070250 A1 | 3/2013 | Ditte et al. |
| 2013/0094024 A1 | 4/2013 | Ruhland et al. |
| 2013/0097882 A1 | 4/2013 | Bridges et al. |
| 2013/0125408 A1 | 5/2013 | Atwell et al. |
| 2013/0162472 A1 | 6/2013 | Najim et al. |
| 2013/0176453 A1 | 7/2013 | Mate et al. |
| 2013/0201487 A1 | 8/2013 | Ossig et al. |
| 2013/0205606 A1 | 8/2013 | Briggs et al. |
| 2013/0212889 A9 | 8/2013 | Bridges et al. |
| 2013/0222816 A1 | 8/2013 | Briggs et al. |
| 2013/0300740 A1 | 11/2013 | Snyder et al. |
| 2014/0002608 A1 | 1/2014 | Atwell et al. |
| 2014/0049784 A1 | 2/2014 | Woloschyn et al. |
| 2015/0109419 A1 | 4/2015 | Vollrath et al. |
| 2015/0378023 A1 | 12/2015 | Royo |

FOREIGN PATENT DOCUMENTS

| | | |
|---|---|---|
| CN | 2236119 y | 9/1996 |
| CN | 1307241 A | 8/2001 |
| CN | 2508896 Y | 9/2002 |
| CN | 2665668 Y | 12/2004 |
| CN | 1630804 A | 6/2005 |
| CN | 1630805 A | 6/2005 |
| CN | 1688867 A | 10/2005 |
| CN | 1735789 | 2/2006 |
| CN | 1812868 A | 8/2006 |
| CN | 1818537 A | 8/2006 |
| CN | 1838102 A | 9/2006 |
| CN | 1839293 A | 9/2006 |
| CN | 1853084 A | 10/2006 |
| CN | 1926400 A | 3/2007 |
| CN | 101024286 A | 8/2007 |

(56) References Cited

FOREIGN PATENT DOCUMENTS

| | | |
|---|---|---|
| CN | 101156043 A | 4/2008 |
| CN | 101163939 A | 4/2008 |
| CN | 101371099 A | 2/2009 |
| CN | 101416024 A | 4/2009 |
| CN | 101484828 A | 7/2009 |
| CN | 201266071 Y | 7/2009 |
| CN | 101506684 A | 8/2009 |
| CN | 101511529 A | 8/2009 |
| DE | 2216765 A1 | 4/1972 |
| DE | 3227980 A1 | 5/1983 |
| DE | 3245060 A1 | 7/1983 |
| DE | 3340317 A1 | 8/1984 |
| DE | 4027990 C1 | 2/1992 |
| DE | 4222642 A1 | 1/1994 |
| DE | 4340756 A1 | 6/1994 |
| DE | 4303804 A1 | 8/1994 |
| DE | 4445464 A1 | 7/1995 |
| DE | 4410775 A1 | 10/1995 |
| DE | 4412044 A1 | 10/1995 |
| DE | 29622033 | 2/1997 |
| DE | 19543763 A1 | 5/1997 |
| DE | 19601875 A1 | 7/1997 |
| DE | 19607345 A1 | 8/1997 |
| DE | 19720049 A1 | 11/1998 |
| DE | 19811550 A1 | 9/1999 |
| DE | 19820307 A1 | 11/1999 |
| DE | 19850118 A1 | 5/2000 |
| DE | 19928958 A1 | 11/2000 |
| DE | 10114126 A1 | 10/2001 |
| DE | 10026357 A1 | 1/2002 |
| DE | 20208077 U1 | 5/2002 |
| DE | 10137241 A1 | 9/2002 |
| DE | 10155488 A1 | 5/2003 |
| DE | 10232028 A1 | 2/2004 |
| DE | 10336458 A1 | 2/2004 |
| DE | 10244643 A1 | 4/2004 |
| DE | 20320216 U1 | 4/2004 |
| DE | 10304188 A1 | 8/2004 |
| DE | 10326848 A1 | 1/2005 |
| DE | 202005000983 U1 | 3/2005 |
| DE | 10361870 A1 | 7/2005 |
| DE | 102004015668 B3 | 9/2005 |
| DE | 102004015111 A1 | 10/2005 |
| DE | 102004028090 A1 | 12/2005 |
| DE | 202006005643 U1 | 8/2006 |
| DE | 102004010083 B4 | 11/2006 |
| DE | 102005043931 A1 | 3/2007 |
| DE | 102005056265 A1 | 5/2007 |
| DE | 102006053611 A1 | 5/2007 |
| DE | 102005060967 A1 | 6/2007 |
| DE | 102006023902 A1 | 11/2007 |
| DE | 102006024534 A1 | 11/2007 |
| DE | 102006035292 A1 | 1/2008 |
| DE | 202006020299 U1 | 5/2008 |
| DE | 102007037162 A1 | 2/2009 |
| DE | 102008014274 A1 | 8/2009 |
| DE | 102008039838 A1 | 3/2010 |
| DE | 102005036929 B4 | 6/2010 |
| DE | 102008062763 B3 | 7/2010 |
| DE | 102009001894 A1 | 9/2010 |
| DE | 102009035336 B3 | 11/2010 |
| DE | 102009055988 B3 | 3/2011 |
| DE | 102010032726 B3 | 11/2011 |
| DE | 102010032725 A1 | 1/2012 |
| DE | 202011051975 U1 | 2/2013 |
| DE | 102012107544 B3 | 5/2013 |
| EP | 0546784 A2 | 6/1993 |
| EP | 0667549 A2 | 8/1995 |
| EP | 0727642 A1 | 8/1996 |
| EP | 0730210 A1 | 9/1996 |
| EP | 0614517 A1 | 3/1997 |
| EP | 0838696 A1 | 4/1998 |
| EP | 0949524 A1 | 10/1999 |
| EP | 1160539 A1 | 12/2001 |
| EP | 1189124 A1 | 3/2002 |
| EP | 0767357 B1 | 5/2002 |
| EP | 1310764 A2 | 5/2003 |
| EP | 1342989 A2 | 9/2003 |
| EP | 1347267 A1 | 9/2003 |
| EP | 1361414 A1 | 11/2003 |
| EP | 1452279 A1 | 9/2004 |
| EP | 1468791 A1 | 10/2004 |
| EP | 1056987 B1 | 4/2005 |
| EP | 1528410 A1 | 5/2005 |
| EP | 1669713 A1 | 6/2006 |
| EP | 1734425 | 12/2006 |
| EP | 1429109 B1 | 4/2007 |
| EP | 1764579 | 12/2007 |
| EP | 1878543 A2 | 1/2008 |
| EP | 1967930 A2 | 9/2008 |
| EP | 2003419 A1 | 12/2008 |
| EP | 2023077 A1 | 2/2009 |
| EP | 2060530 A1 | 5/2009 |
| EP | 2068067 A1 | 6/2009 |
| EP | 2068114 | 6/2009 |
| EP | 2108917 A1 | 10/2009 |
| EP | 2177868 A2 | 4/2010 |
| EP | 2259013 A1 | 12/2010 |
| EP | 2400261 A1 | 12/2011 |
| FR | 2603228 A1 | 3/1988 |
| FR | 2935043 A1 | 2/2010 |
| GB | 894320 | 4/1962 |
| GB | 1112941 | 5/1968 |
| GB | 2222695 A | 3/1990 |
| GB | 2255648 A | 11/1992 |
| GB | 2336493 A | 10/1999 |
| GB | 2341203 A | 3/2000 |
| GB | 2388661 A | 11/2003 |
| GB | 2420241 A | 5/2006 |
| GB | 2447258 A | 9/2008 |
| GB | 2452033 A | 2/2009 |
| JP | 5581525 | 6/1955 |
| JP | 575584 A | 1/1982 |
| JP | 68171291 A | 1/1983 |
| JP | 6827264 | 2/1983 |
| JP | 61062885 A | 3/1986 |
| JP | 63135814 A | 6/1988 |
| JP | 0357911 A | 3/1991 |
| JP | 04115108 A | 4/1992 |
| JP | 04225188 A1 | 8/1992 |
| JP | 04267214 A | 9/1992 |
| JP | 0572477 A | 3/1993 |
| JP | 06313710 A | 11/1994 |
| JP | 1994313710 A | 11/1994 |
| JP | 06331733 | 12/1994 |
| JP | 06341838 | 12/1994 |
| JP | 074950 A | 1/1995 |
| JP | 07128051 A | 5/1995 |
| JP | 7210586 A | 8/1995 |
| JP | 07229963 A | 8/1995 |
| JP | 0815413 A | 1/1996 |
| JP | 0821714 A | 1/1996 |
| JP | 08129145 A | 5/1996 |
| JP | H08136849 A | 5/1996 |
| JP | 08262140 A | 10/1996 |
| JP | 0921868 A | 1/1997 |
| JP | 10213661 A | 8/1998 |
| JP | 1123993 A | 1/1999 |
| JP | 2001056275 A | 8/1999 |
| JP | 2000121724 A | 4/2000 |
| JP | 2000249546 A | 9/2000 |
| JP | 2000339468 A | 12/2000 |
| JP | 2001013001 A | 1/2001 |
| JP | 2001021303 A | 1/2001 |
| JP | 2001337278 A | 12/2001 |
| JP | 2003050128 A | 2/2003 |
| JP | 2003156330 A | 5/2003 |
| JP | 2003156562 A | 5/2003 |
| JP | 2003194526 A | 7/2003 |
| JP | 2003202215 A | 7/2003 |
| JP | 2003308205 A | 10/2003 |
| JP | 2004109106 A | 4/2004 |
| JP | 2004245832 A | 9/2004 |
| JP | 2004257927 A | 9/2004 |

(56) References Cited

FOREIGN PATENT DOCUMENTS

| | | |
|---|---|---|
| JP | 2004333398 A | 11/2004 |
| JP | 2004348575 A | 12/2004 |
| JP | 2005030937 A | 2/2005 |
| JP | 2005055226 A | 3/2005 |
| JP | 2005069700 A | 3/2005 |
| JP | 2005174887 A | 6/2005 |
| JP | 2005517908 A1 | 6/2005 |
| JP | 2005215917 A | 8/2005 |
| JP | 2005221336 A | 8/2005 |
| JP | 2005257510 A | 9/2005 |
| JP | 2006038683 A | 2/2006 |
| JP | 2006102176 A | 4/2006 |
| JP | 2006203404 A | 8/2006 |
| JP | 2006226948 A | 8/2006 |
| JP | 2006241833 A | 9/2006 |
| JP | 2006266821 A | 10/2006 |
| JP | 2006301991 A | 11/2006 |
| JP | 2007514943 A | 6/2007 |
| JP | 2007178943 A | 7/2007 |
| JP | 2008076303 A | 4/2008 |
| JP | 2008082707 A | 4/2008 |
| JP | 2008096123 A | 4/2008 |
| JP | 2008107286 A | 5/2008 |
| JP | 2008304220 A | 12/2008 |
| JP | 2009063339 A | 3/2009 |
| JP | 2009524057 | 6/2009 |
| JP | 2009531674 A | 9/2009 |
| JP | 2009229255 A | 10/2009 |
| JP | 2009541758 A | 11/2009 |
| JP | 2010169405 A | 8/2010 |
| WO | 8801924 A1 | 3/1988 |
| WO | 8905512 A1 | 6/1989 |
| WO | 9208568 A1 | 5/1992 |
| WO | 9711399 | 3/1997 |
| WO | 9808050 A1 | 2/1998 |
| WO | 9910706 A1 | 3/1999 |
| WO | 0014474 | 3/2000 |
| WO | 0014474 A1 | 3/2000 |
| WO | 0020880 A2 | 4/2000 |
| WO | 0026612 A1 | 5/2000 |
| WO | 0033149 A1 | 6/2000 |
| WO | 0034733 A1 | 6/2000 |
| WO | 0063645 A1 | 10/2000 |
| WO | 0063681 A2 | 10/2000 |
| WO | 0177613 A1 | 10/2001 |
| WO | 02084327 A2 | 10/2002 |
| WO | 02101323 A2 | 12/2002 |
| WO | 2004096502 A1 | 11/2004 |
| WO | 2005008271 A2 | 1/2005 |
| WO | 2005059473 A2 | 6/2005 |
| WO | 2005072917 A1 | 8/2005 |
| WO | 2005075875 | 8/2005 |
| WO | 2005100908 A1 | 10/2005 |
| WO | 2006000552 A1 | 1/2006 |
| WO | 2006014445 A1 | 2/2006 |
| WO | 2006051264 A1 | 5/2006 |
| WO | 2006053837 A1 | 5/2006 |
| WO | 2007002319 A1 | 1/2007 |
| WO | 2007012198 A1 | 2/2007 |
| WO | 2007028941 | 3/2007 |
| WO | 2007051972 A1 | 5/2007 |
| WO | 2007087198 A1 | 8/2007 |
| WO | 2007118478 A1 | 10/2007 |
| WO | 2007125081 A1 | 11/2007 |
| WO | 2007144906 A1 | 12/2007 |
| WO | 2008019856 A1 | 2/2008 |
| WO | 2008027588 A2 | 3/2008 |
| WO | 2008047171 A1 | 4/2008 |
| WO | 2008048424 A2 | 4/2008 |
| WO | 2008052348 A1 | 5/2008 |
| WO | 2008064276 A3 | 5/2008 |
| WO | 2008066896 | 6/2008 |
| WO | 2008068791 A1 | 6/2008 |
| WO | 2008075170 A1 | 6/2008 |
| WO | 2008121073 A1 | 10/2008 |
| WO | 2008157061 A1 | 12/2008 |
| WO | 2009001165 A1 | 12/2008 |
| WO | 2009016185 A1 | 2/2009 |
| WO | 2009053085 A1 | 4/2009 |
| WO | 2009083452 A1 | 7/2009 |
| WO | 2009095384 A2 | 8/2009 |
| WO | 2009123278 A1 | 10/2009 |
| WO | 2009127526 A1 | 10/2009 |
| WO | 2009130169 A1 | 10/2009 |
| WO | 2009149740 A1 | 12/2009 |
| WO | 2010040742 A1 | 4/2010 |
| WO | 2010092131 A1 | 8/2010 |
| WO | 2010108089 A2 | 9/2010 |
| WO | 2010108644 A1 | 9/2010 |
| WO | 2010148525 A1 | 12/2010 |
| WO | 2011000435 A1 | 1/2011 |
| WO | 2011000955 A1 | 1/2011 |
| WO | 2011021103 A1 | 2/2011 |
| WO | 2011029140 A1 | 3/2011 |
| WO | 2011057130 A2 | 5/2011 |
| WO | 2011002908 A1 | 6/2011 |
| WO | 2011090829 A2 | 7/2011 |
| WO | 2011090895 A1 | 7/2011 |
| WO | 2012037157 A2 | 3/2012 |
| WO | 2012038446 A1 | 3/2012 |
| WO | 2012061122 A1 | 5/2012 |
| WO | 2012013525 A2 | 8/2012 |
| WO | 2012103525 A2 | 8/2012 |
| WO | 2012112683 A2 | 8/2012 |
| WO | 2013188026 A1 | 12/2013 |
| WO | 2013190031 A1 | 12/2013 |

OTHER PUBLICATIONS

Willoughby, P., "Elastically Averaged Precisoin Alignment", In: "Doctoral Thesis", Jun. 1, 2005, Massachusetts Institute of Technology, XP55005620, abstract 1.1 Motivation, Chapter 3, Chapter 6.

International Preliminary Report on Patentability and Written Opinion for PCT/EP2010/001779; Date of Issuance Sep. 27, 2011; 7 pages.

International Search Report for International Patent Application PCT/EP2010/001779; Date of Mailing Jul. 20, 2010; 3 pages.

Jasiobedzki, Piotr, "Laser Eye—A New 3D Sensor for Active Vision", SPIE -Sensor Fusion VI, vol. 2059, Sep. 7, 1993, pp. 316-321, XP00262856, Boston, U.S.A., Retrieved from the Internet: URL:http://scitation.aip.org/getpdf/servlet/Ge.

Jaspemeite, et al., Enhancements to the Time Synchronization Standard IEEE-1588 for a System of Cascaded Bridges, IEEE, 2004.

Jgeng "DLP-Based Structured Light 3D Imaging Technologies and Applications" (15 pages) Emerging Digital Micromirror Device Based Systems and Application III; edited by Michael R. Douglass, Patrick I. Oden, Proc. of SPIE, vol. 7932, 79320B; (2011) SPIE.

Kreon Laser Scanners, Getting the Best in Cutting Edge 3D Digitizing Technology, B3-D MCAD Consulting/Sales [online], [retrieved Nov. 29, 2011], http://www.b3-d.com/Kreon.html.

Langford, et al., "Practical Skills in Forensic Science", Pearson Education Limited, Essex, England, First Published 2005, Forensic Chemistry.

Laser Reverse Engineering with Microscribe, [online], [retrieved Nov. 29, 2011], http://www.youtube.com/watch?v=8VRz_2aEJ4E&feature=PlayList&p=F63ABF74F3ODC81B&playnext=1&playnext_from=Pl&index=1.

Leica Geosystems TruStory Forensic Analysis by Albuquerque Police Department, 2006.

Leica Geosystems, FBI Crime Scene Case Study, Tony Grissim, Feb. 2006; 11 pages.

Leica Geosystems: "Leica Rugby 55 Designed for Interior Built for Construction", Jan. 1, 2009, XP002660558, Retrieved from the Internet: URL:http://www.leica-geosystems.com/downloads123/zz/lasers/Rugby%2055/brochures/Leica_Rugby_55_brochure_en.pdf [re.

Leica TPS800 Performance Series—Equipment List, 2004.

Merriam-Webster (m-w.com), "Interface". 2012. http://www.merriam-webster.com/dictionary/interface.

(56) References Cited

OTHER PUBLICATIONS

Merriam-Webster (m-w.com), "Parts". 2012. http://www.merriam-webster.com/dictionary/parts.
Merriam-Webster (m-w.com), "Traverse". 2012. http://www.merriam-webster.com/dictionary/traverse.
Mg Lee; "Compact 3D LIDAR based on optically coupled horizontal and vertical Scanning mechanism for the autonomous navigation of robots" (13 pages) vol. 8037; downloaded from http://proceedings.spiedigitallibrary.org/ on Jul. 2, 2013.
MicroScan 3D User Guide, RSI GmbH, 3D Systems & Software, Oberursel, Germany, email: info@rsi-gmbh.de, copyright RSI Roland Seifert Imaging GmbH 2008.
Moog Components Group "Technical Brief; Fiber Optic Rotary Joints" Document No. 303 (6 pages) Mar. 2008; MOOG, Inc. 2008 Canada; Focal Technologies.
MOOG Components Group; "Fiber Optic Rotary Joints; Product Guide" (4 pages) Dec. 2010; MOOG, Inc. 2010.
Non-Final Office Action for U.S. Appl. No. 13/259,446 dated Oct. 3, 2014; 23 pages.
Office Action for Application No. GB1118132.8 dated May 31, 2016; 2 pages.
P Ben-Tzvi, et al "Extraction of 3D Images Using Pitch-Actuated 2D Laser Range Finder for Robotic Vision" (6 pages) BNSDOCID <XP 31840390A_1_>, Oct. 15, 2010.
Patrick Willoughby; "Elastically Averaged Precision Alignment"; In: "Doctoral Thesis" ; Jun. 1, 2005; Massachusetts Institute of Technology; XP55005620; Abstract 1.1 Motivation; Chapter 3, Chapter 6.
Provision of a copy of the minutes in accordance with Rule 124(4) EPC dated Aug. 14, 2013, filed in Opposition re Application No. 07 785 873.6/U.S. Pat. No. 2,062,069, Proprietor: Faro Technologies, Inc., filed by Leica Geosystem AG on Feb. 5, 2013.
Romer "Romer Absolute Arm Maximum Performance Portable Measurement" (Printed Oct. 2010); Hexagon Metrology, Inc. htt://us:ROMER.com; Hexagon Metrology, Inc. 2010.
Romer "Romer Measuring Arms Portable CMMs for R&D and shop floor" (Mar. 2009) Hexagon Metrology (16 pages).
Romer Measuring Arms; Portable CMMs for the shop floor; 20 pages; Hexagon Metrology, Inc. (2009) http//us.ROMER.com.
RW Boyd "Radiometry and the Detection of Otpical Radiation" (pp. 20-23) 1983 Jon wiley & Sons, Inc.
Sauter, et al., Towards New Hybrid Networks for Industrial Automation, IEEE, 2009.
Se, et al., "Instant Scene Modeler for Crime Scene Reconstruction", MDA, Space Missions, Ontario, Canada, Copyright 2005, IEEE; 8 pages.
Spada, et al., IEEE 1588 Lowers Integration Costs in Continuous Flow Automated Production Lines, XP-002498255, ARC Insights, Insight # 2003-33MD&H, Aug. 20, 2003.
Surman et al. "An autonomous mobile robot with a 3D laser range finder for 3D exploration and digitalization of indoor enviornments." Robotics and Autonomous Systems vol. 45 No. 3-4, Dec. 31, 2003, pp. 181-198. Amsterdamn, Netherlands.
The Scene, Journal of the Association for Crime Scene Reconstruction, Apr.-Jun. 2006, vol. 12, Issue 2; 31 pages.
Trimble—Trimble SPS630, SPS730 and SPS930 Universal Total Stations, [on-line] http://www.trimble.com/sps630_730_930.shtml (1 of 4), [Retrieved Jan. 26, 2010 8:50:29AM].
Umeda, K., et al., Registration of Range and Color Images Using Gradient Constraints and Ran Intensity Images, Proceedings of the 17th International Conference onPatern Recognition (ICPR'04), Copyright 2010 IEEE [Retrieved online Jan. 28, 2010—IEEE.
Williams, J.A., et al., Evaluation of a Novel Multiple Point Set Registration Algorithm, Copyright 2000, [Retrieved on Jan. 18, 2010 at 04:10 from IEEE Xplore], pp. 1006-1010.
English translation of Japanese Office Action for JP Application No. 2012-521117; Iissued Mar. 18, 2014; Mailed Mar. 25, 2014; 4 pages.

"Scanner Basis Configuration for Riegl VQ-250", Riegl Company Webpage, Feb. 16, 2011 [retrieved on Apr. 19, 2013]. Retrieved from the internet; 3 pages.
14th International Forensic Science Symposium, Interpol—Lyon, France, Oct. 19-22, 2004, Review Papers, Edited by Dr. Niamh Nic Daeid, Forensic Science Unit, Univeristy of Strathclyde, Glasgow, UK; 585 pages.
A. Hart; "Kinematic Coupling Interchangeability" Precision Engineering; vol. 28, No. 1; Jan. 1, 2004 pp. 1-15.
ABB Flexibile Automation AB: "Product Manual IRB 6400R M99, On-line Manual"; Sep. 13, 2006; XP00002657684; [Retrieved on Sep. 28, 2011]. Retrieved from the Internet: (See URL Below).
ABB Flexible Automation AB: "Product Manual IRB 6400R M99, On-line Manual"; Sep. 13, 2006; XP00002657684; Retrieved from the Internet: URL: http://pergatory.mit.edu/kinematiccouplings/case_studies/ABB_Robotics/general/6400R%20Product%20Manual.pdf (re.
Akca, Devrim, "Full Automated Registration of Laser Scanner Point Clouds", Institute of Geodesy and Photogrammetry, Swiss Federal Institute of Technology, Zuerich, Switzerland; Published Dec. 2003, 8 pages.
Akca, Devrim, Full Automatic Registration of Laser Scanner Point Clouds, Optical 3D Measurement Techniques, vol. VI, 2003, XP002590305, ETH, Swiss Federal Institute of Technology, Zurich, Institute of Geodesy and Photogrammetry, DO1:10.3929/ethz-a-004656.
Anonymous : So wird's gemacht: Mit T-DSL and Windows XP Home Edition gemeinsam ins Internet (Teil 3) Internet Citation, Jul. 2003, XP002364586, Retrieved from Internet: URL:http://support.microsfot.com/kb/814538/DE/ [retrieved on Jan. 26, 2006].
Bornaz, L., et al., "Multiple Scan Registration in Lidar Close-Range Applications," The International Archives of the Photogrammetry, Remote Sensing and Spatial Information Sciences, vol. XXXIV, Part 5/W12, Jul. 2003, pp. 72-77, XP002590306.
Bouvet, D., et al., "Precise 3-D Localization by Automatic Laser Theodolite and Odometer for Civil-Engineering Machines", Proceedings of the 2001 IEEE International Conference on Robotics and Automation. ICRA 2001. Seoul, Korea, May 21-26, 2001; IEEE, US.
Brenneke et al: "Using 3D laser range data for slam in outsoor enviornments." Proceedings of the 2003 IEEE/RSJ International Conference on Intelligent Robots and Systems. Las Vegas, NV Oct. 27-31, 2003; IEEE US, vol. 1, Oct. 27 2003, pp. 188-193.
Brenneke, C., et al., "Using 3D Laser Range Data for Slam in Outdoor Environments", Proceedings of the 2003 IEEE/RSJ International Conference on Intelligent Robots and Systems. (IROS 2003); Las Vegas, NV, Oct. 27-31, 2003; [IEEE/RSJ International Confer.
Cho, et al., Implementation of a Precision Time Protocol over Low Rate Wireless Personal Area Networks, IEEE, 2008. 8 pages.
Cho, et al., Implementation of a Precision Time Protocol over Low Rate Wireless Personal Area Networks, IEEE, 2008.
Cooklev, et al., An Implementation of IEEE 1588 Over IEEE 802.11 b for Syncrhonization of Wireless Local Area Network Nodes, IEEE Transactions on Instrumentation and Measurement, vol. 56, No. 5, Oct. 2007, 8 pages.
Decision Revoking the European Patent (Art. 101(3)(b) EPC) dated Aug. 14, 2013, filed in Opposition re Application No. 07 785 873.6/U.S. Pat. No. 2,062,069, Proprietor: Faro Technologies, Inc., filed by Leica Geosystem AG on Feb. 5, 2013, 12 pages.
Dylan, Craig R., High Precision Makes the Massive Bay Bridge Project Work. Suspended in MidAir-Cover Story-Point of Beginning, Jan. 1, 2010, [online] http://www.pobonline.com/Articles/Cover_Story/BNP_GUID_9-5-2006_A_10000000000 . . .[Retreived 1/25/2.
Electro-Optical Information Systems, "The Handy Handheld Digitizer". [online], [retrieved on Nov. 29, 2011], http://vidibotics.com/htm/handy.htm, 2 pages.
Elstrom, M.D., et al., Stereo-Based Registration of LADAR and Color Imagery, Intelligent Robots and Computer Vision XVII: Algorithms, Techniques, and Active Vision, Boston, MA, USA, vol. 3522, Nov. 2, 1998, Nov. 3, 1998 pp. 343-354.

(56) References Cited

OTHER PUBLICATIONS

Elstrom, M.D., Stereo-Based Registration of LADAR and Color Imagery, Part of SPIE Conference on Intelligent Robots and Computer Vision XVII: Algorithms, Techniques, and Active Vision, Boston, MA, Nov. 1998, SPIE vol. 3522, 0277-786X/98; [Retrieved on.
English translation of Japanese Office Action for JP Application No. 2012-521117, issued Mar. 25, 2014.
English translation of Japanese Office Action for JP Application No. 2012-521117, issues Mar. 25, 2014.
English translation of Japanese Office Action for JP Application No. 2012-521117; Iissued Mar. 18, 2014; Mailed Mar. 25, 2014; 4 pages.
English translation of Japanese Office Action for JP Application No. 2012-525222; Issued Mar. 25, 2014; Mailed Apr. 1, 2014; 12 pages.
EO Edmund Optics "Silicon Detectors" (5 pages) 2013 Edmund Optics, Inc. http://www.edmundoptics.com/electro-optics/detector-components/silicon-detectors/1305[Oct. 15, 2013 10:14:53 AM] .
FARO Laser Scanner LS, Recording Reality's Digital Fingerprint, The Measure of Success, Rev. Aug. 22, 2005, 16 pages.
FARO Laserscanner LS, Presentation Forensic Package, Policeschool of Hessen, Wiesbaden, Germany, Dec. 14, 2005; FARO Technologies, Copyright 2008, 17 pages.
FARO Product Catalog; Faro Arm; 68 pages; Faro Technologies Inc. 2009; printed Aug. 3, 2009.
Franklin, Paul F., What IEEE 1588 Means for Your Next T&M System Design, Keithley Instruments, Inc., [on-line] Oct. 19, 2010, http://www.eetimes.com/General/DisplayPrintViewContent?contentItemId=4209746, [Retreived Oct. 21, 2010], 6 pages.
Gebre, et al. "Remotely Operated and Autonomous Mapping System (ROAMS)." Technologies for Practical Robot Applications, 2009. Tepra 2009. IEEE International Conference on IEEE, Piscataway, NJ, USA. Nov. 9, 2009, pp. 173-178.
Ghost 3D Systems, Authorized MicroScribe Solutions, FAQs—MicroScribe 3D Laser, MicroScan Tools, & related info, [online], [retrieved Nov. 29, 2011], http://microscribe.ghost3d.com/gt_microscan-3d_faqs.htm, 4 pages.
Godin, G., et al., A Method for the Registration of Attributed Range Images, Copyright 2001, [Retrieved on Jan. 18, 2010 at 03:29 from IEEE Xplore]. pp. 178-186.
GoMeasure3D—Your source for all things measurement, Baces 3D 100 Series Portable CMM from GoMeasure3D, [online], [retrieved Nov. 29, 2011], http://www.gomeasure3d.com/baces100.html, 3 pages.
Haag, et al., "Technical Overview and Application of 3D Laser Scanning for Shooting Reconstruction and Crime Scene Investigations", Presented at the American Academy of Forensic Sciences Scientific Meeting, Washington, D.C., Feb. 21, 2008; 71 pages.
Hart, A., "Kinematic Coupling Interchangeability", Precision Engineering, vol. 28, No. 1, Jan. 1, 2004, pp. 1-15, XP55005507, ISSN: 0141-6359, DOi: 10.1016/S0141-6359(03)00071-0.
Horn, B.K.P., Closed-Form Solution of Absolute Orientation Using Unit Quaternions, J. Opt. Soc. Am. A., vol. 4., No. 4, Apr. 1987, pp. 629-642, ISSN 0740-3232.
Howard, et al., "Virtual Environments for Scene of Crime Reconstruction and Analysis", Advanced Interfaces Group, Department of Computer Science, University of Manchester, Manchester, UK, Feb. 28, 2000.
Huebner, S.F., "Sniper Shooting Tecnhique", "Scharfschutzen Schiebtechnik", Copyright by C.A. Civil Arms Verlag GmbH, Lichtenwald 1989, Alle Rechte vorbehalten, pp. 11-17.
HYDROpro Navigation, Hydropgraphic Survey Software, Trimble, www.trimble.com, Copyright 1997-2003.
Information on Electro-Optical Information Systems; EOIS 3D Mini-Moire C.M.M. Sensor for Non-Contact Measuring & Surface Mapping; Direct Dimensions, Jun. 1995.
Information onElectro-Optical Information Systems; EOIS 3D Mini-Moire C.M.M. Sensor for Non-Contact Measuring & Surface Mapping; Direct Dimensions, Jun. 1995.
Ingensand, H., Dr., "Introduction to Geodetic Metrology", "Einfuhrung in die Geodatische Messtechnik", Federal Institute of Technology Zurich, 2004, with English translation, 6 pages.
iQsun Laserscanner Brochure, 2 Pages, Apr. 2005.
It is Alive in the Lab, Autodesk University, Fun with the Immersion MicroScribe Laser Scanner, [online], [retrieved Nov. 29, 2011], http://labs.blogs.com/its_alive_in_the_lab/2007/11/fun-with-the-im.html; 3 pages.
J.Geng "Structured-Light 3D Surface Imaging: A Tutorial," Advances in Optics and Photonics 3; Mar. 31, 2011, pp. 128-160; IEEE Intelligent Transportation System Society; 2011 Optical Society of America.
Japanese Office Action and English Language summary for JP2012-550042 filed Jul. 20, 2012; based on International Application No. PCT/US2011/021249 filed Jan. 14, 2011.
Japanese Office Action and English Language summary for JP2012-550043 filed Jul. 20, 2012; based on International Application No. PCT/US2011/021250 filed Jan. 14, 2011.
Japanese Office Action for Application Serial No. 2013-520987; Date of Mailing Jul. 2, 2013.
Japanese Office Action for Japanese Patent Application No. 2012501176; Dated Sep. 3, 2013.

\* cited by examiner

LASER SCANNER HAVING A MULTI-COLOR LIGHT SOURCE AND REAL-TIME COLOR RECEIVER

CROSS REFERENCE TO RELATED APPLICATIONS

The present application is a Continuation-in-Part Application of application Ser. No. 13/259,446, which was filed Sep. 23, 2011, which is a National Stage Application of PCT/EP2010/001779, which was filed on Mar. 22, 2010, which claims priority to Provisional Application No. 61/299,566, which was filed Jan. 29, 2010, and also claims priority to German Patent Application No. 10 2009 015 920.7, which was filed on Mar. 25, 2009, the contents of which are incorporated herein by reference in their entireties.

BACKGROUND OF THE INVENTION

The invention relates to a device for optically scanning and measuring an environment.

By means of a device such as is known for example from DE 20 2006 005 643, and which is designed as a laser scanner, the environment of the laser scanner can be optically scanned and measured. For gaining additional information, a line scan camera, which takes RGB signals, is mounted on the laser scanner, so that the measuring points of the scan can be completed by color information. The camera holder is rotatable. To avoid parallax errors, the camera, for taking its records, is swiveled onto the vertical rotational axis of the laser scanner, and the laser scanner is lowered until the camera has reached the horizontal rotational axis. This method requires a high precision of the components.

It is known to attach color cameras in or on laser scanners. Such scanners collect color information in a series of steps disconnected from the measuring of 3D coordinates of object points in an environment. The color information is, a later step, superimposed on the 3D coordinates using an interpolation and mapping method. In many cases, color data is incomplete and, in other cases, color data is not correctly aligned to corresponding 3D features. What is needed is a scanner having features that overcome these limitations.

SUMMARY OF THE INVENTION

Embodiments of the present invention are based on the object of creating an alternative to the device of the type mentioned hereinabove.

According to an embodiment of the present invention, a laser scanner is provided for optically scanning and measuring an environment. The laser scanner includes a light emitter configured to emit an emission light beam, the emission light beam being a superposition of a first light, a second light, a third light, and a fourth light, the first light being modulated, the second, third, and fourth lights each having a different wavelength in the visible spectrum; a collimator configured to collimate the emission light beam; a steering mirror having a reflective surface and configured to rotate about a first axis, the steering mirror further configured to deflect the emission light beam onto an object point in the environment and to receive a reception light beam reflected from the object point; scanner optics configured to receive the reception light beam from the steering mirror; an optical receiver configured to receive the reception light beam from the steering mirror, the optical receiver further configured to send the first light in a first path and to send the second, third, and fourth lights in a second path; a control and evaluation unit configured to receive the first light in the first path, to convert the first light into a first electrical signal, and to determine a distance to the object based at least in part on the first electrical signal; a color receiver configured to receive the second, third, and fourth lights on the second path, to convert the second, third, and fourth lights into second, third, and fourth electrical signals, and to determine a first color value, a second color value, and a third color value based at least in part on the second, third, and fourth electrical signals; a measuring head configured to rotate around a second axis perpendicular to the first axis, the first axis and the second axis intersecting in a gimbal point, the gimbal point being located on the steering mirror; and a processor configured to determine a three-dimensional color representation of the object point, the three-dimensional color representation based at least in part on the distance to the object, the first color value, the second color value, and the third color value.

According to another embodiment of the present invention, a method is provided for optically scanning and measuring an environment with a laser scanner. The method includes providing a light emitter, a collimator, a steering mirror, scanner optics, an optical receiver, a control and evaluation unit, a color receiver, a measuring head, and a processor; modulating a first light; combining the first light with a second light, a third light, and a fourth light to obtain an emission light beam, the second, third, and fourth lights each having a different wavelength in the visible spectrum; collimating the emission light beam with the collimator; deflecting the emission light beam onto an object point in the environment with the steering mirror and in response receiving a reception light beam reflected from the object point; receiving with the optical receiver the reception light beam from the steering mirror; sending with the optical receiver the first light in the reception beam in a first path and the second, third, and fourth light in the reception beam in a second path; receiving with the control and evaluation unit the first light in the first path, converting the first light into a first electrical signal, and determining a distance to the object based at least in part on the first electrical signal; receiving with the color receiver the second, third, and fourth lights on the second path, converting the second, third, and fourth lights into second, third, and fourth electrical signals, and determining a first color value, a second color value, and a third color value based at least in part on the second, third, and fourth electrical signals; rotating the measuring head around a second axis perpendicular to the first axis, the first axis and the second axis intersecting in a gimbal point, the gimbal point being located on the steering mirror; and determining with the processor a three-dimensional color representation of the object point, the three-dimensional color representation based at least in part on the distance to the object, the first color value, the second color value, and the third color value; and storing the three-dimensional color representation of the object point.

BRIEF DESCRIPTION OF THE DRAWINGS

The invention is explained in more detail below on the basis of exemplary embodiments illustrated in the drawings, in which.

DETAILED DESCRIPTION OF THE INVENTION

Figure 1:
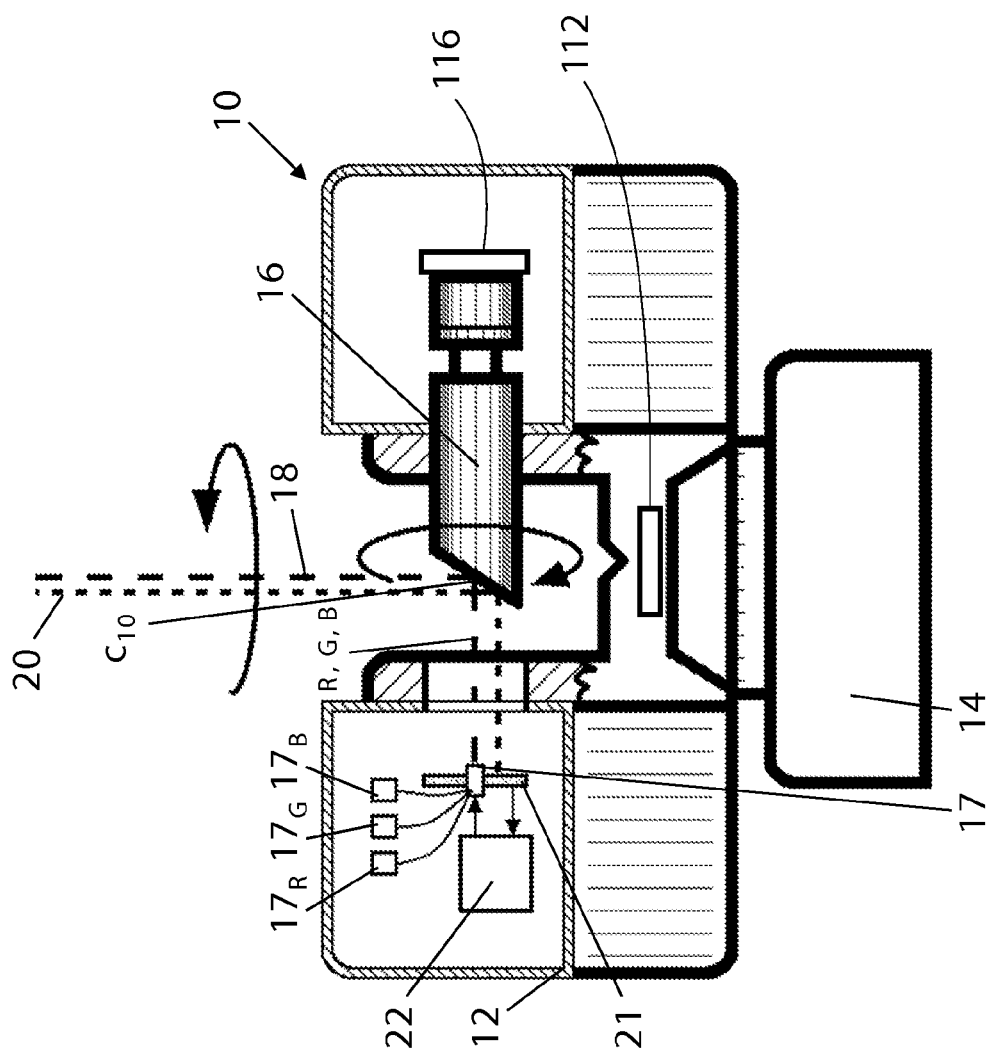
FIG. 1 is a partial sectional view of the laser scanner according to an embodiment.
Figure 2:
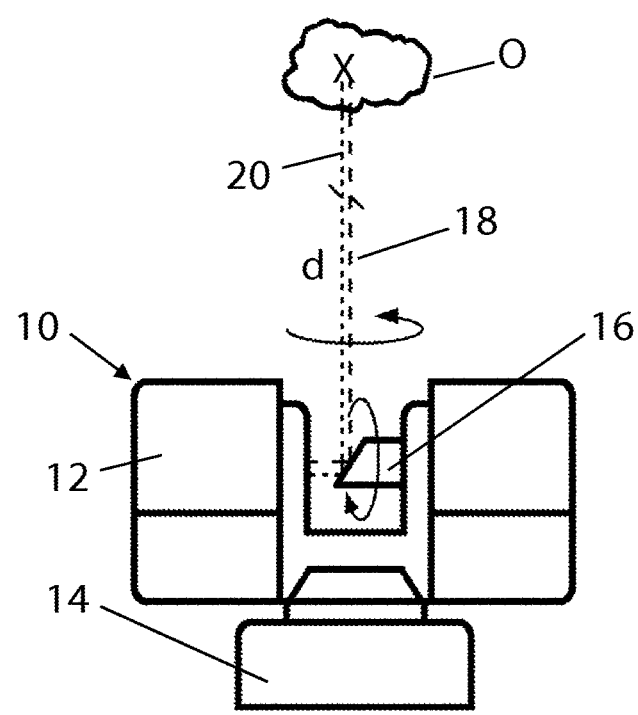
FIG. 2 is a schematic illustration of the laser scanner according to an embodiment.

Referring to FIGS. 1 and 2, a laser scanner 10 is provided as a device for optically scanning and measuring the environment of the laser scanner 10. The laser scanner 10 has a measuring head 12 and a base 14. The measuring head 12 is mounted on the base 14 as a unit that can be rotated around a vertical axis. The measuring head 12 has a mirror 16, which can be rotated around a horizontal axis. The intersection point of the two rotational axes is designated center C10 of the laser scanner 10.

The measuring head 12 is further provided with a light emitter 17 for emitting an emission light beam 18. The emission light beam 18 is a superposition of three laser beams R (red), G (green) and B (blue) which, with different wavelengths, are within the visible range of approximately 400 to 700 nm wavelength, such as 650 nm, 530 nm and 470 nm. The wavelengths of the three laser beams R, G and B are selected in such a way that they define the three-dimensional RGB color space, i.e. that they are distributed well over the visible range. The laser emitter 17 has three laser diodes 17R, 17G, 17B (or other lasers), each of which generates one of the three laser beams R, G or B. The superposition can take place by feeding the three free laser beams R, G and B into the collimator of the light emitter 17 or by feeding them into a common optical fiber which is then fed to the collimator.

At least one of the three laser beams R, G, B in the emission light beam 18, and in an embodiment all three laser beams R, G, B, are amplitude-modulated, for example with a sinusoidal or with a rectangular-waveform modulation signal. The emission light beam 18 is emitted by the light emitter 17 onto the mirror 16, where it is deflected and emitted to the environment. A reception light beam 20, which is reflected in the environment by an object O or scattered otherwise, is captured by the mirror 16, deflected and directed onto a light receiver 21. The direction of the emission light beam 18 and of the reception light beam 20 results from the angular positions of the mirror 16 and the measuring head 12, which depend on the positions of their corresponding rotary drives which, in turn, are registered by one angular encoder each 112, 116 (see FIG. 1, for example). A control and evaluation unit 22 has a data connection to the light emitter 17 and the light receiver 21 in measuring head 12, whereby parts of such unit can be arranged also outside the measuring head 12, for example a computer connected to the base 14. The control and evaluation unit 22 determines, for a multitude of measuring points X, the distance d between the laser scanner 10 (i.e. the center C10) and the (illuminated point at) object O, from the propagation time of emission light beam 18 and reception light beam 20. For this purpose, the phase shift between the two light beams 18 and 20 is determined and evaluated.

Scanning takes place along a circle by means of the relatively quick rotation of the mirror 16. By virtue of the relatively slow rotation of the measuring head 12 relative to the base 14, the whole space is scanned step by step, by means of the circles. The entity of measuring points X of such a measurement is designated scan. For such a scan, the center C10 of the laser scanner 10 defines the stationary reference system of the laser scanner 10, in which the base 14 rests. Further details of the laser scanner 10 and particularly of the design of measuring head 12 are described for example in U.S. Pat. No. 7,430,068 and DE 20 2006 005 643, the respective disclosures being incorporated by reference.

To determine the distance d of the measuring points X by means of evaluation of the phase shift, it is sufficient to use only one of the three wave lengths, i.e. the modulated of the three laser beams R, G and B. If necessary, this beam can have a somewhat higher intensity (i.e. power of the electromagnetic wave) compared to the two other beams. Basically, all wavelengths are suitable to the same extent. With regard to eye protection, which can better be obtained with wavelengths below 400 nm, due to the behavior of the receptors of the human eye, it is, however, advantageous to use the blue laser beam B (with a wavelength shorter than 400 nm), for determining the distances d of the measuring points X. If the two other laser beams R and G are modulated as well, their evaluation can be used for eliminating ambient light or for gaining additional distance information.

In addition to the distance d to the center C10 of the laser scanner 10, each measuring point X comprises color and brightness information which is determined by the control and evaluation unit 22 as well, i.e. the brightness values for any of the three colors of the laser beams R, G and B. Each brightness value corresponds to a gray-tone value which is determined, for example, by integration of the bandpass-filtered and amplified signal of the light receiver 21 over a measuring period which is attributed to the measuring point X, namely for any of the three laser beams R, G, and B separately. All three laser beams R, G and B consequently contribute to gaining the color and brightness information.

Optionally, the light emitter 17 can be designed in such a way that the three laser beams R, G and B can be switched on and off independently of each other and that their intensity can also be controlled. The composition of the emission light beam 18 can then be adapted to the application. If, for example, only the distance d and the brightness (gray-tone value) shall be measured, it is sufficient to use, for example, the blue laser beam B and to let the other two laser beams R and G switched off. A modular design is also possible for the light emitter 17, so that the laser diodes for generating the three laser beams R, G and B can be mounted and dismounted independently of each other, for example, being plug-in components or the like. If applicable, only the laser diode necessary for generating the laser beam which serves to determine the distance d, is mounted permanently.

Figure 3:
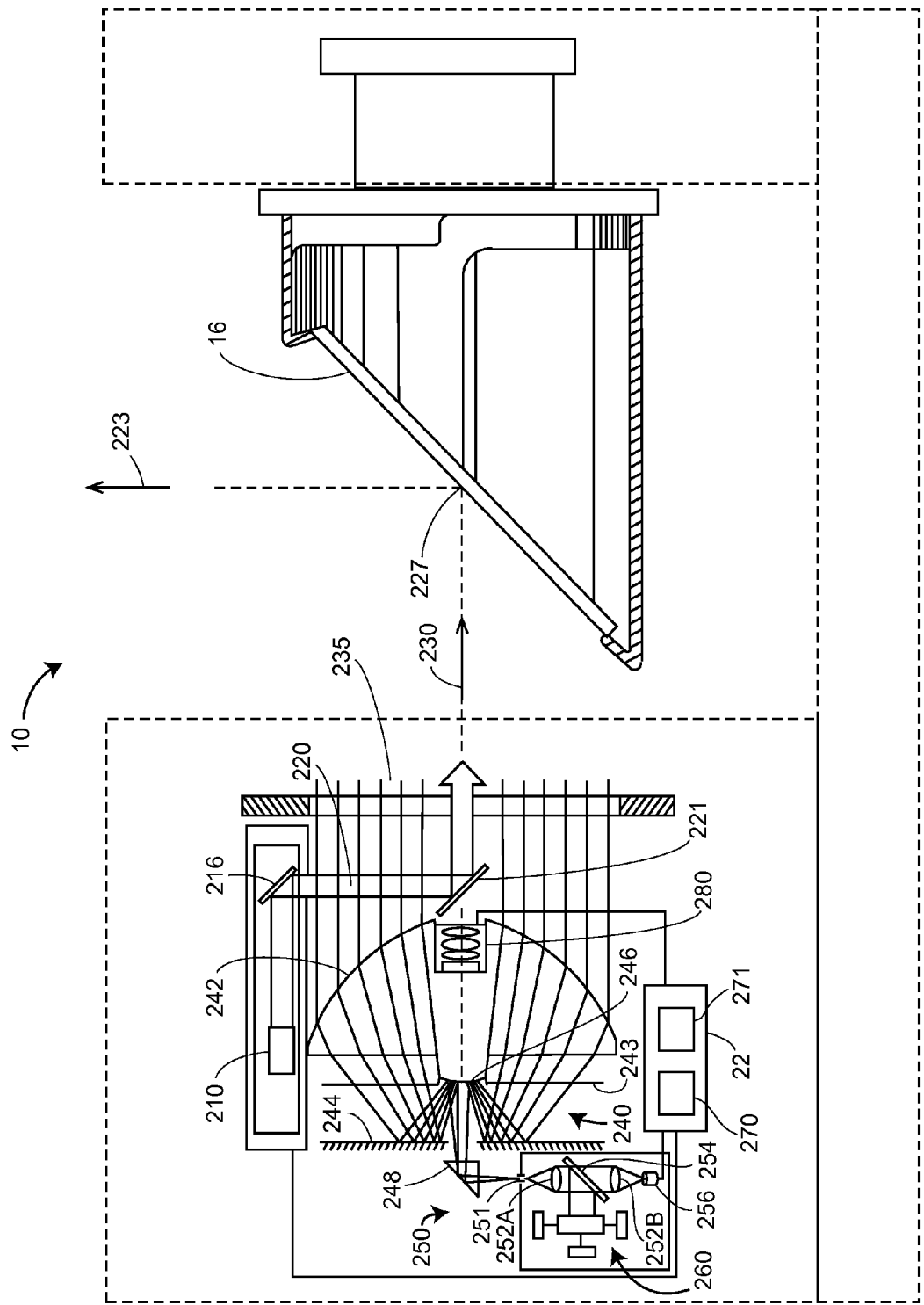
FIG. 3 is a schematic illustration of internal components within the laser scanner according to an embodiment.

In another embodiment described with reference to FIGS. 3-5, the scanner 10 includes a light emitter 210 that includes a modulated light source for measuring distance and three light beams having R, G, and B wavelengths for producing a color image of the environment. In an embodiment, the modulated light source that is used to measure distance has an infrared wavelength, for example, 1550 nm or 1310 nm. The beam of light 220 emitted and collimated by the light source 210 reflects off a stationary mirror or beam splitter 221 before traveling along direction 230 to reflect off rotating mirror 16 at a gimbal point 227 to travel along direction 223. The beam of light continues to object O, where it strikes the object at a measuring point X. Light scattered or reflected off the object returns to the rotating mirror 16, from which it enters the scanner optics 240 in a relatively large beam of light 235. In an embodiment, scanner optics 240 includes aspheric lens 242, mask 243, flat mirror 244, curved mirror 246, and right angle prism reflector 248. Light passes from scanner optics into optical receiver 250. Optical receiver may include aperture 251, collimating lens 252A, 252B, dichroic beam splitter 254, and fiber-optic ferrule 256. Light from scanner optics 240 passes through the aperture 251 and is collimated by collimating lens 252A. In an embodiment, the portion of light used for distance measurement, for example a modulated infrared portion of the light, is passed in a first direction via a first optical path by the dichroic beam splitter 254, while the portion of light that includes R, G, and B wavelengths is passed in a second direction via a second optical path into a color receiver 260. The infrared light passes through the dichroic beam splitter 254, enters the fiber-optic ferrule 256 and passes into control and evaluation unit 22, the control and evaluation unit including an electro-optical receiver 270 and a processor 271, the control and evaluation unit configured to determine the distance from the scanner to the target point X. In an embodiment, the distance is determined by the processor 271 based at least in part on the phases of modulated light entering the electro-optical receiver 270. The scanner may also include, in addition to a real-time receiver 260 (which serves as a type of color camera), the scanner may also include a multi-pixel color camera 280 that captures colored light passing through a dichroic beam splitter 221. In use, the optional camera 280 captures color images at a time before or after the 3D measurement is performed.

Figure 5:
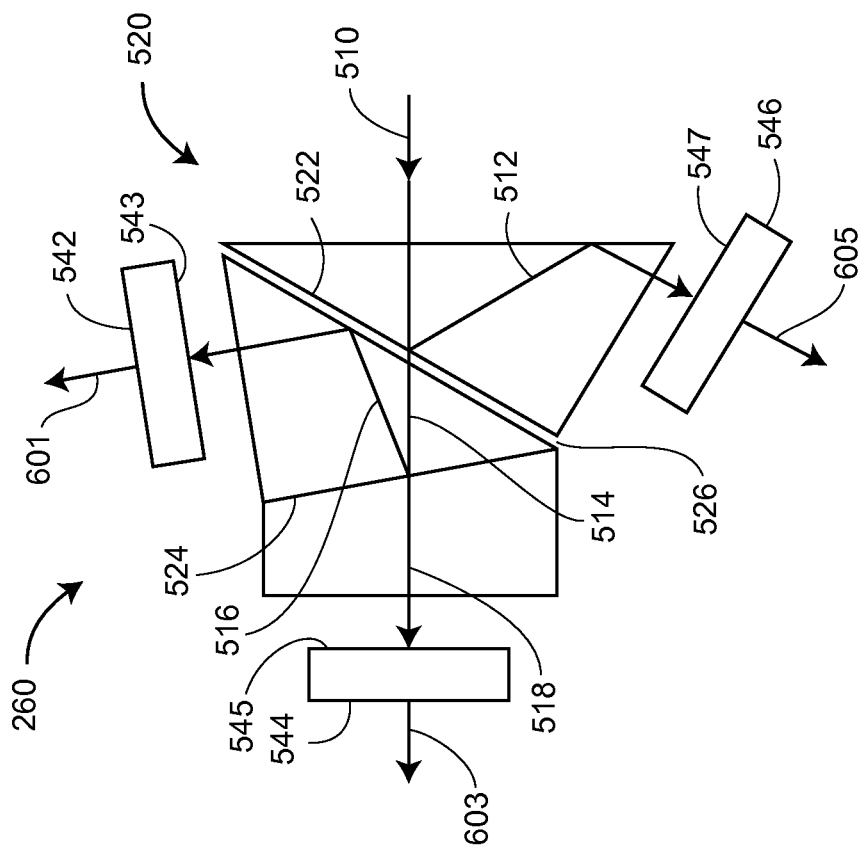
FIG. 5 is a schematic illustration of a color receiver according to an embodiment.
Figure 6:
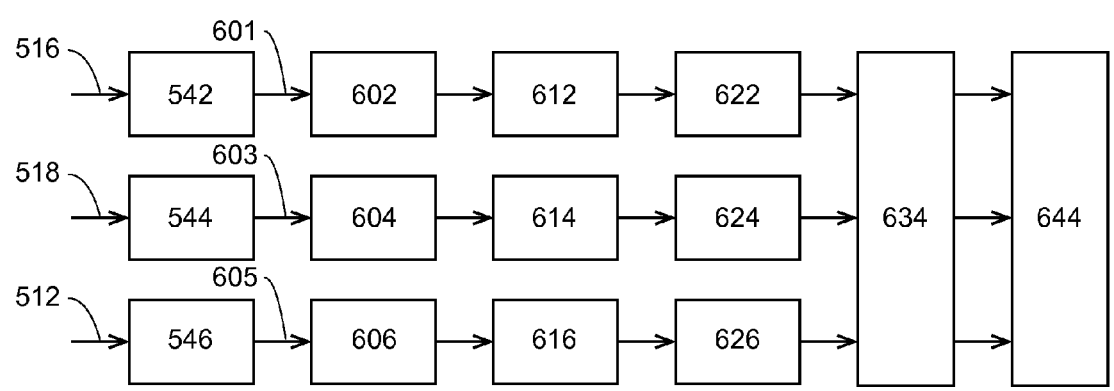
FIG. 6 is a block diagram illustration optional optical and electrical elements of the color receiver.

The color receiver 260 passes the three colors of light R, G, B to three corresponding optical detectors 542, 544, 546 (see FIGS. 5 and 6, for example). The light received by each of the optical detectors is converted into an electrical signal, and respective first, second, and third color values determined based on the strength of the respective electrical signals from the optical detectors, which is sent to a processor, which might be the processor 271, another processor elsewhere in the scanner 10, or a processor in an external computer. The three colors of light are assigned to the corresponding distance measurement obtained from the modulated infrared light (for example) and from angles measured by angular encoders 112, 116, the angles indicating an angle of rotation of mirror 16 about its axis of rotation (nominally horizontal in the normal mounting position of the scanner 10) and an angle of rotation of the scanner unit about a pan axis (nominally vertical in the normal mounting position of the scanner 10, the axis passing through the gimbal point 227). In other words, the three color values obtained from the color receiver 260 for a given measured point X are stored by the processor 271 or another processor along with the measured distance and measured angles for the same measured point X.

Figure 4:
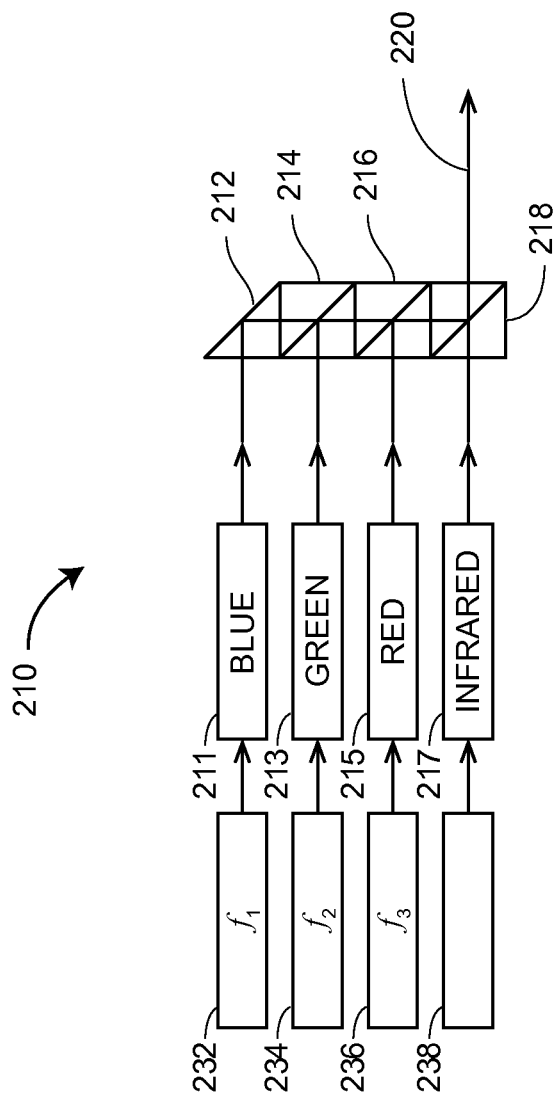
FIG. 4 is a schematic illustration of a multi-color light source according to an embodiment.

In an embodiment, the light source 210 combines light from four light sources 211, 213, 215, and 217 as shown in FIG. 4. One way to combine the four wavelengths of light is to use an optical element, such as a right angle mirror 212 combined with a collection of serially connected dichroic beam splitters 214, 216, and 218, for example. In an embodiment, blue light from light source 211 is reflected by a right angle mirror 212, passes to dichroic beam splitter 214 where it is combined with green light. The combined blue-green light passes to dichroic beam splitter 216 where it is combined with red light. The combined blue-green-red light passes to dichroic beam splitter 218 where it is combined with modulated infrared light. The beam of light 220 includes all four wavelengths provided by the light sources 211, 213, 215, and 217. In an embodiment, the blue, green and red lights are unmodulated, while only the infrared light is modulated, for example, by multiple different RF or microwave frequencies. In another embodiment, illustrated in FIG. 4, the blue light source, the green light source, and the red light source are intensity modulated at frequencies $f_1$, $f_2$, and $f_3$, respectively, by means of electrical modulation components 232, 234, and 236. The modulation may be applied as a sine wave or a square wave, for example. If the sample rate of the scanner is approximately 1 MHz per second, the modulation rates might be, for example, $f_1$=10 MHz, $f_2$=20 MHz, and $f_3$=30 MHz.

In an embodiment, the color receiver 260 passes the three colors of light to optical detectors 542, 544, and 546 as shown in FIGS. 5 and 6. Many optical arrangements may be used to separate the three colors of light and send these to the three optical detectors. One method would be to use concatenated dichroic beam splitters as was done in FIG. 4. Another way to separate the light is to use a glass optical element, such as a trichroic beam splitter element 520, for example. In an embodiment, light 510 reflected off dichroic beam splitter 254 contains three colors R, G, and B. The light 510 passes into the trichroic beam splitter. When it arrives at coated surface 522, blue light 512 is reflected off the coating and is reflected a second time through optical bandpass filter 547 into optical detector 546. The optical bandpass filter may be a thin-film filter applied directly to the optical detector 546 or it may be a separate filter element placed in front of the optical detector. The optical bandpass filter 547 is configured to pass blue light and to reflect or absorb other wavelengths of light. The red-green light 514 continues to travel in the glass until it reaches coated surface 524, where it is separated into reflected red light 516 and transmitted green light 518. The green light 518 passes through optical bandpass filter 545 into optical detector 544. The reflected red light 516 undergoes total internal reflection at air gap 526 before passing through optical bandpass filter 543 into optical detector 542.

The color receiver 260 further includes electro-optical and electrical components shown in FIG. 6. The blue light 512, red light 516, and green light 518 reach optical detectors 546, 542, and 544, respectively. The optical detectors convert the light beams 512, 516, and 518 into corresponding electrical signals 605, 601, and 603. In an embodiment, the optical detectors 542, 544, and 546 are avalanche photodiodes (APDs). In an embodiment electrical signals are sent to a transimpedance amplifier 602, 604, 606 before being sent to a bandpass filter 612, 614, 616 and onto a high gain amplifier 622, 624, 626. The optional bandpass filter is used if the B, G, R light sources 211, 213, 215 are modulated at frequencies $f_1$, $f_2$, $f_3$. For example, if one million points are measured per second, then it might be reasonable to modulate the blue, green, and red laser diodes sinusoidal at 10 MHz, 20 MHz, and 30 MHz, respectively. In this case, the bandpass filters 612, 614, 616 would have center frequencies of 10 MHz, 20 MHz, and 30 MHz, respectively, and each filter might have a bandwidth of 3 MHz. Advantages of using an electrical bandpass filter 612, 614, 616 include reduction of optical background noise and out-of-band electrical (e.g., thermal) noise. The result is an improvement in the signal-to-noise ratio in the desired colors leaving the electrical bandpass filters. The electrical signals leaving amplifiers 622, 624, 626 are sent to analog-to-digital converter (ADC) 634, which converts the analog electrical signals into digital electrical signals, and from which determines respective first, second, and third color values. The digital electrical signals are sent to a processor, which might be the processor 271, another processor internal to the scanner 10, or a processor in an external computer. In an embodiment, the processor 271 is configured via executable code to determine and store a three-dimensional color representation of the object point, the three-dimensional color representation based at least in part on the distance to the object, the first color value, the second color value, and the third color value. In an embodiment, the processor 271 is further configured to determine a three-dimensional color representation of the object point based on the first angle of rotation and the second angle of rotation. In an embodiment, the processor 271 is further configured to determine a three-dimensional color representation of a plurality of object points, the three-dimensional color representation based at least in part on the distance to the object, the first color value, the second color value, and the third color value measured for each of a plurality of object points.

The scanner discussed hereinabove is of a type referred to as a time-of-flight (TOF) scanner. This type of scanner determines distance to a target based on the time required for the light to travel from the scanner to the target and back. This round-trip time depends on the speed of light in air, which is equal to the speed of light in vacuum divided by the index of refraction in air. The index of refraction of light in air in turn depends on the temperature, pressure, and humidity of the air and the wavelength of the light. A scanner that operates on a different physical principle is a triangulation scanner. Such a scanner determines distance to a target based on a trigonometric calculation based on triangle distances and angles. In a triangulation scanner, distance to a target is not directly dependent on the speed of light in air.

One type of TOF scanner modulates laser light (which might be infrared laser light, for example) simultaneously at several different modulation frequencies. It reflects the modulated laser light off a spinning mirror 16 to a target. Because the light is kept constantly moving, only a relatively small portion of the optical power of the light has the possibility of reaching a human eye and passing to the retina. Because of this, as long as the beam of light is activated only when the mirror 16 is spinning, eye safe operation (for example, class 1 laser safety operation for infrared light or class 2 laser safety operation for visible light), with the laser power higher than would be possible for a stationary laser beam. For example, for laser light at 1550 nm, eye safe (class 1) laser safety operation for a continually applied laser beam requires that the laser power be kept below 20 mW. For 1550 nm laser light reflected off a rapidly spinning mirror, the laser light may be in the class 1 limit for an optical power of a few hundred mW. A similar increase in laser power above the limit of 1 mW for class 2 (eye safe) operation for continually applied laser light at visible wavelengths is also possible for light from laser light sources 211, 213, and 215.

An advantage of the apparatus and methods described herein is that colors are assigned in one-to-one correspondence to measured 3D coordinates, thereby enabling more accurate color matching and eliminate problems such as color skew that can occur when mapping colors onto measured 3D points.

Although the colors in the beam of light 220 are described above as being red, green, and blue, it is possible to use other colors. Each set of three colors spans a color space from which intermediate colors may be derived by combining the three colors in various proportions. It should be understood that in the discussion above, the three colors R, G, and B may be replaced by any other three colors in the visible spectrum.

The invention claimed is:

1. A laser scanner for optically scanning and measuring an environment, comprising:
a light emitter configured to emit an emission light beam, the emission light beam being a superposition of a first light, a second light, a third light, and a fourth light, the first light being modulated, the second, third, and fourth lights each having a different wavelength in the visible spectrum;
a collimator configured to collimate the emission light beam;
a steering mirror having a reflective surface and configured to rotate about a first axis, the steering mirror further configured to deflect the emission light beam onto an object point in the environment and to receive a reception light beam reflected from the object point;
scanner optics configured to receive the reception light beam from the steering mirror;
an optical receiver configured to receive the reception light beam from the steering mirror, the optical receiver further configured to send the first light in a first path and to send the second, third, and fourth lights in a second path;
a control and evaluation unit configured to receive the first light in the first path, to convert the first light into a first electrical signal, and to determine a distance to the object based at least in part on the first electrical signal;
a color receiver configured to receive the second, third, and fourth lights on the second path, to convert the second, third, and fourth lights into second, third, and fourth electrical signals, and to determine a first color value, a second color value, and a third color value based at least in part on the second, third, and fourth electrical signals;
a measuring head configured to rotate around a second axis perpendicular to the first axis, the first axis and the second axis intersecting in a gimbal point, the gimbal point being located on the steering mirror; and
a processor configured to determine a three-dimensional color representation of the object point, the three-dimensional color representation based at least in part on the distance to the object, the first color value, the second color value, and the third color value.

2. The laser scanner of claim 1 further comprising:
a first angular encoder configured to measure a first angle of rotation about the first axis; and
a second angular encoder configured to measure a second angle of rotation about the second axis.

3. The laser scanner of claim 2 wherein the processor is further configured to determine a three-dimensional color representation of the object point based on the first angle of rotation and the second angle of rotation.

4. The laser scanner of claim 1 wherein the color receiver further includes a first optical element configured to separate the second, third, and fourth lights.

5. The laser scanner of claim 4 wherein the first optical element is configured to direct the second light, third light, and fourth light to a second optical detector, a third optical detector, and a fourth optical detector, respectively, to obtain the second electrical signal, the third electrical signal, and the fourth electrical signal, respectively.

6. The laser scanner of claim 5 wherein the color receiver further includes an analog-to-digital converter configured to receive the second electrical signal, the third electrical signal, and the fourth electrical signal, and to determine in response the first color value, the second color value, and the third color value, respectively.

7. The laser scanner of claim 5 wherein the color receiver further comprises an optical bandpass filter optically disposed in front of each one of the second, third, and fourth optical detectors, respectively.

8. The laser scanner of claim 5 wherein the light emitter includes a second optical element configured to combine the first, second, third, and fourth lights, the second optical element including a plurality of dichroic beam splitters.

9. The laser scanner of claim 5 wherein the second, third, and fourth lights are modulated at a second, third, and fourth frequency respectively, the second, third, and fourth frequencies each being a different frequency.

10. The laser scanner of claim 9 wherein the second electrical signal, the third electrical signal, and the fourth electrical signal are sent through a first bandpass filter, a second bandpass filter, and a third bandpass filter, respectively, each of the first bandpass filter, the second bandpass filter, and the third bandpass filter having a different center frequency.

11. The laser scanner of claim 1 wherein the processor is further configured to determine a three-dimensional color representation of a plurality of object points, the three-dimensional color representation based at least in part on the distance to the object, the first color value, the second color value, and the third color value measured for each of a plurality of object points.

12. A method for optically scanning and measuring an environment with a laser scanner, the method comprising:
   providing a light emitter, a collimator, a steering mirror rotatable about a first axis, scanner optics, an optical receiver, a control and evaluation unit, a color receiver, a measuring head rotatable about a second axis, and a processor;
   modulating a first light;
   combining the first light with a second light, a third light, and a fourth light to obtain an emission light beam, the second, third, and fourth lights each having a different wavelength in the visible spectrum;
   collimating the emission light beam with the collimator;
   deflecting the emission light beam onto an object point in the environment with the steering mirror and in response receiving a reception light beam reflected from the object point;
   receiving with the optical receiver the reception light beam from the steering mirror;
   sending with the optical receiver the first light in the reception beam in a first path and the second, third, and fourth light in the reception beam in a second path;
   receiving with the control and evaluation unit the first light in the first path, converting the first light into a first electrical signal, and determining a distance to the object based at least in part on the first electrical signal;
   receiving with the color receiver the second, third, and fourth lights on the second path, converting the second, third, and fourth lights into second, third, and fourth electrical signals, and determining a first color value, a second color value, and a third color value based at least in part on the second, third, and fourth electrical signals;
   rotating the measuring head around the second axis perpendicular to the first axis, the first axis and the second axis intersecting in a gimbal point, the gimbal point being located on the steering mirror; and
   determining with the processor a three-dimensional color representation of the object point, the three-dimensional color representation based at least in part on the distance to the object, the first color value, the second color value, and the third color value; and
   storing the three-dimensional color representation of the object point.

* * * * *